United States Patent
Enokida et al.

(10) Patent No.: US 6,927,874 B1
(45) Date of Patent: Aug. 9, 2005

(54) IMAGE PROCESSING METHOD, APPARATUS AND STORAGE MEDIUM THEREFOR

(75) Inventors: Miyuki Enokida, Yokohama (JP); Kentaro Matsumoto, Higashikurume (JP); Kunihiro Yamamoto, Yokohama (JP); Kiyoshi Kusama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/538,223

(22) Filed: Mar. 30, 2000

(30) Foreign Application Priority Data

| Apr. 2, 1999 | (JP) | 11-097039 |
| Apr. 13, 1999 | (JP) | 11-105740 |
| Feb. 25, 2000 | (JP) | 2000-049266 |
| Mar. 8, 2000 | (JP) | 2000-063661 |

(51) Int. Cl.$^7$ .............................................. G06F 15/00
(52) U.S. Cl. ..................... 358/1.18; 358/1.15; 358/447; 358/463; 382/266; 382/275; 382/236
(58) Field of Search ............................. 358/1.18, 1.15, 358/447, 463; 382/236, 254, 266, 275, 284

(56) References Cited

U.S. PATENT DOCUMENTS

| 6,075,905 A | * | 6/2000 | Herman et al. | 382/284 |
| 6,097,854 A | * | 8/2000 | Szeliski et al. | 382/284 |
| 6,137,498 A |  | 10/2000 | Silvers | 345/435 |
| 6,373,992 B1 | * | 4/2002 | Nagao | 382/266 |

FOREIGN PATENT DOCUMENTS

| JP | 60-200375 A | 10/1985 |
| JP | 62-168276 A | 7/1987 |
| JP | 3-280174 A | 12/1991 |
| JP | 4-24794 | 2/1992 |
| JP | 4-318912 A | 11/1992 |
| JP | 10-269353 A | 10/1998 |
| JP | 11-31153 A | 2/1999 |
| JP | 11-39332 A | 2/1999 |
| JP | 11-341264 A | 12/1999 |
| JP | 11-341265 A | 12/1999 |
| JP | 11-345313 A | 12/1999 |
| JP | 11-345329 A | 12/1999 |
| JP | 2000-172840 A | 6/2000 |
| JP | 2000-295453 A | 10/2000 |

OTHER PUBLICATIONS

Silvers, R., "Photomosaics" Edited by Michael Hawley, An Owl Book, Henry Holt and Company, New York.

\* cited by examiner

Primary Examiner—Twyler M. Lamb
(74) Attorney, Agent, or Firm—Fitzpatrick, Cella, Harper & Scinto

(57) ABSTRACT

An image processing method and apparatus for forming a mosaic image by combining a plurality of material images, dividing a first image that is the basis of the mosaic image into a plurality of tile areas, comparing each tile area with each of the material images, selecting a material image that most resembles the tile area in terms of color or luminance and pasting this material image to the tile area, thereby creating a mosaic image.

51 Claims, 16 Drawing Sheets

203
MATERIAL IMAGES
(P IMAGES)

| (0,0) | (1,0) | (2,0) |
|-------|-------|-------|
| (0,1) | (1,1) | (2,1) |
| (0,2) | (1,2) | (2,2) |

IMAGE PROCESSING METHOD, APPARATUS AND STORAGE MEDIUM THEREFOR

FIELD OF THE INVENTION

This invention relates to an image processing method, apparatus and storage medium for generating a mosaic image by combining a plurality of material images into a mosaic pattern.

BACKGROUND OF THE INVENTION

According to Sanseido's "Dictionary of the Modern Japanese Language", a mosaic is a "design or method in which small pieces of stone, glass or marble etc. of various colors are combined and imbedded in a floor or wall." By using this technique, a number of photographic images can be combined to form a design or a single image (i.e., a mosaic image). The generation of a mosaic image is achieved by splitting the basic design or image into a plurality of tiles and pasting material images that most closely resemble these tile images to the tile areas.

The prior art described above, however, involves a number of problems.

Specifically, there can be instances where, depending upon the image that is the basis of the mosaic, identical material images are pasted to a plurality of the tile areas from among the tile areas obtained by dividing the image. In a region in which these identical material images concentrate within the mosaic image thus generated, these material images produce a certain texture and there is the possibility that this will give rise to a pattern or stripes, etc., not present in the original design or image or not intended. There may even be cases where the generated mosaic image becomes one not in compliance with the user's intentions. In such instances, a process which includes manipulating the basic image and generating the mosaic image again based upon the manipulated image must be executed repeatedly until a mosaic image in line with the user's intentions is generated.

Further, if material images the colors of which closely resemble the colors of the tile areas do not exist when a mosaic image is generated in this manner, the image quality of the mosaic image produced using these material images will decline.

SUMMARY OF THE INVENTION

Accordingly, an object of the present invention is to provide an image processing method, apparatus and storage medium in which the occurrence of patterns and texture not intended at the creation of a mosaic image is prevented.

Another object of the present invention is to provide an image processing method, apparatus and storage medium in which material images intended by the user are selected to generate a high-quality mosaic image.

Another object of the present invention is to provide an image processing method, apparatus and storage medium in which a mosaic image in line with user preferences can be formed.

Still another object of the present invention is to provide an image processing method, apparatus and storage medium for preferentially selecting and assigning material images to be assigned to a designated partial region of an original image, and assigning other material images to non-priority regions, thereby improving the image quality of the image formed.

A further object of the present invention is to provide an image processing method, apparatus and storage medium for generating a mosaic image rendered in black and white by executing processing which selects and pastes corresponding material images taking note not of color-difference components but of the luminance component of the original image.

According to the present invention, the foregoing objects are attained by providing an image processing apparatus for forming a mosaic image by combining a plurality of material images, comprising: input means for inputting a first image that is the basis of a mosaic image; storage means for storing the plurality of material images; image characteristic acquisition means for dividing the first image into a plurality of areas, subdividing each of these areas into a plurality of subareas and obtaining a first image characteristic of each subarea; designation means for designating an important area of the material images which form the mosaic image; means for obtaining the first image characteristic and a second image characteristic of each of the plurality of material images in dependence upon the important area designated by the designation means; distance calculation means for calculating a difference between the first image characteristic and the second image characteristic to thereby calculate distances between each area of the first image and each of the material images; and selection means for selecting a material image corresponding to each area in dependence upon the distances calculated by the distance calculation means.

Further, according to the present invention, the following objects are attained by providing an image processing apparatus for forming a mosaic image by combining a plurality of material images stored in storage means, comprising: input means for inputting a first image that is the basis of a mosaic image; dividing means for dividing the first image into a plurality of image areas; designation means for designating an important area of the material images which form the mosaic image; and selection means for selecting material images corresponding to the image areas based upon the important area designated by the designation means.

Further, according to the present invention, the foregoing objects are attained by providing an image processing apparatus for forming a mosaic image by combining a plurality of material images, comprising: input means for inputting a first image that is the basis of a mosaic image; storage means for storing the plurality of material images; image characteristic acquisition means for dividing the first image into a plurality of areas and obtaining an image characteristic of each area; weighting input means for inputting weighting information for selecting material images that form the mosaic image; distance calculation means for obtaining distances between the image characteristic of each area and image characteristics of each of the plurality of material images based upon the weighting information that has been input by the weighting input means; and selection means for selecting material images corresponding to respective ones of the areas in dependence upon the distances calculated by the distance calculation means.

Further, according to the present invention, the following objects are attained by providing an image processing apparatus for combining a plurality of material images, which have been selected from a plurality of material images, to thereby create an image patterned after an original image, comprising: dividing means for dividing the original image into a plurality of areas; luminance calculation means for calculating average luminance of each of the plurality of areas obtained by division by the dividing means; image selection means for selecting material images corresponding to respective ones of the plurality of areas based upon the average luminance of each of the plurality of areas calculated by the luminance calculation means and the luminance of each material image; and image pasting means for generating an image by pasting the material images selected by the image selection means to respective ones of corresponding areas.

In an embodiment of the present invention, image characteristics are acquired by obtaining average R, G, B values of a plurality of pixel values.

Further, a mosaic image is generated by pasting the material images thus obtained to corresponding areas.

In a preferred embodiment, the distance between the average luminance of each of the plurality of areas obtained by dividing the original image and the average luminance of each material image is calculated and the material image for which the distance is shortest is selected as the material image corresponding to the particular area.

Further, an arrangement may be adopted in which a partial region of the basic original image is designated, a material image optimum for this designated partial region is selected preferentially and the selected material image is pasted to this partial region.

Further, an arrangement may be adopted in which when a subarea obtained by subdividing a basic original image and a subarea obtained by subdividing each material image are compared, an area having a high priority is set among these subareas, and material images are selected and pasted in dependence upon degree of similarity with this area of high priority.

Furthermore, the luminances of the tile areas and the luminances of the material images may be compared, a material image the luminance whereof is close to that of a tile image may be rendered in black and white and this material image may then pasted to this tile area, thereby creating a monochrome mosaic image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram useful in describing subdivision into subareas for obtaining a feature quantity of a tile area or material image;

DESCRIPTION OF THE PREFERRED EMBODIMENTS

Preferred embodiments of the present invention will now be described in detail with reference to the accompanying drawings.

[General Method of Generating Mosaic Image]

Figure 1:
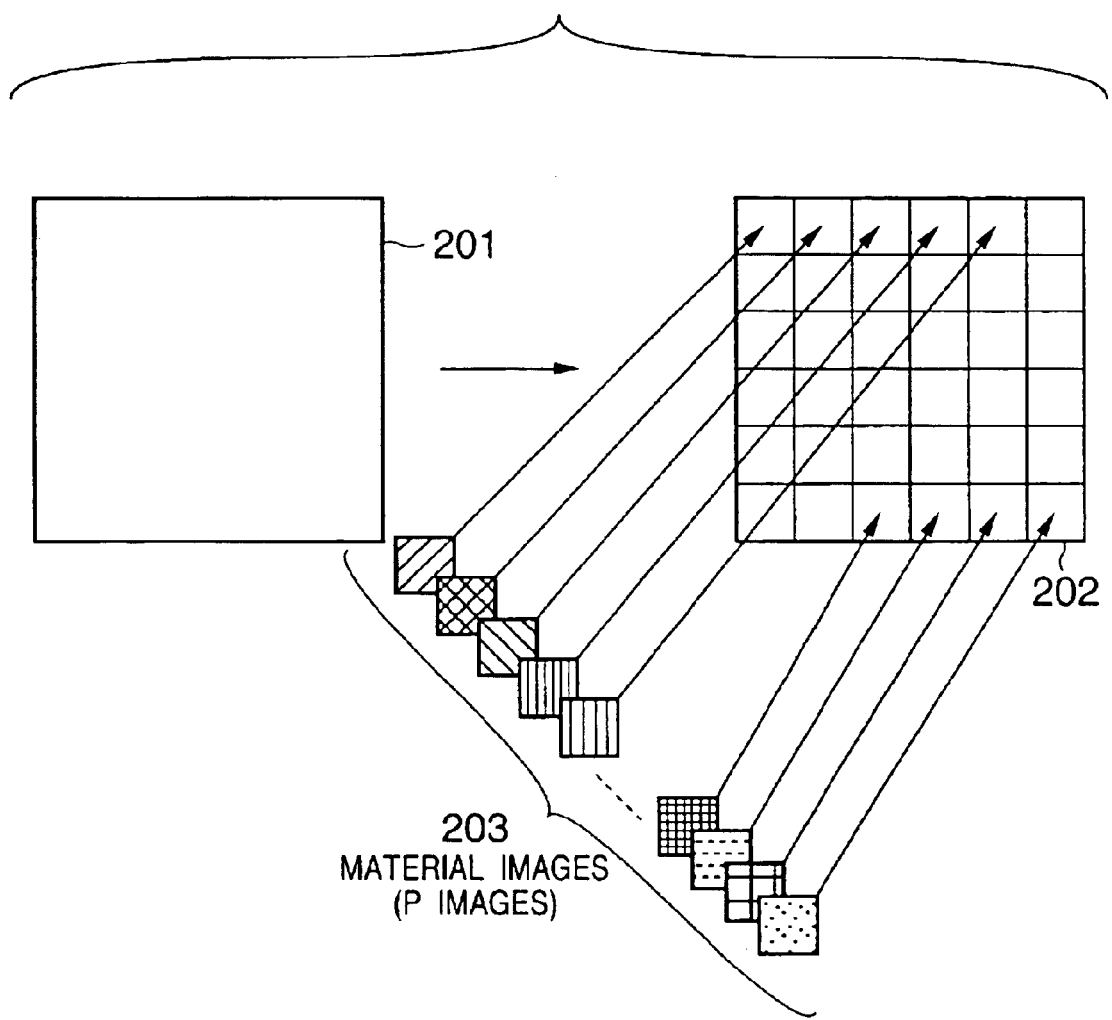
FIG. 1 is a diagram showing the relationship between an original first image and material images of a plurality of types used in a mosaic.

FIG. 1 is a diagram for describing the relationship among images of a plurality of types used in general mosaic processing.

A first image 201 in FIG. 1 is a design or image (e.g., a photographic image, a computer-graphics image, etc.) on the basis of which an image is to be formed by a mosaic. A second image 202 is a mosaic image formed by dividing the first image 201 into a plurality of areas (tile areas) and pasting material images 203 to these tile areas. Here P-number of material images 203 are provided. The number P and types of the material images generally are adequate to meet the color and texture requirements for forming the second image 202.

In order to simplify the description, the size of each material image 203 in FIG. 1 is made the same as that of the tile areas obtained by dividing the first image 201. However, the size of the material images 203 need not necessarily be made to coincide with the size of the tile areas, and all of the material images 203 need not be of the same size. However, in a case where the size of the material images 203 and the size of the tile areas differ, it is necessary when pasting a material image 203 to a corresponding tile area that the size of this material image 203 be changed in conformity with the size of the tile area. Further, the shape of a tile area is not limited to the rectangular shape in FIG. 1; any shape is permissible. In a case where the shape of a tile area and the shape of material image 203 differ, it will suffice to cut or deform the shape of the material image 203 in conformity with the shape of the tile area to thereby bring the shapes of the material images into conformity with the shapes of the tile areas.

A method of generating an image based upon the mosaic shown in FIG. 1 will now be described with reference to the flowchart of FIG. 2.

The first image 201 is divided into the M×N number of tile areas at step SI. As a result, as shown in FIG. 3, 4×5 (M=4, N=5) rectangular tile areas TL (0,0), TL (1,0), TL (2,0), ..., TL (2,4), ..., TL (3,3), TL (3,4) are generated.

Figure 3:
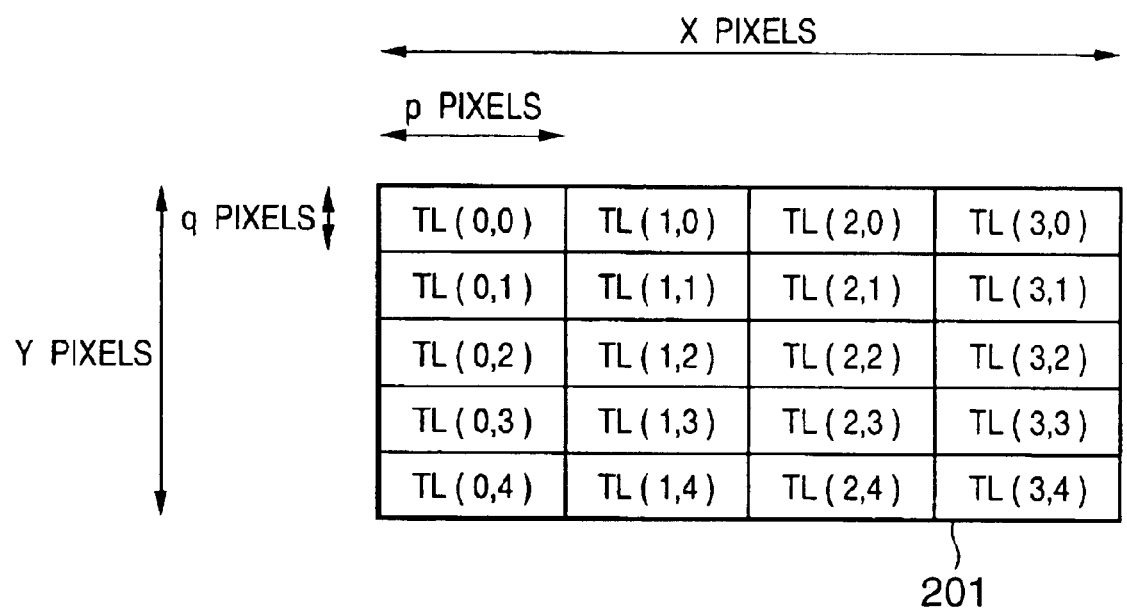
FIG. 3 is a diagram showing a state in which the first image has been divided into M×N tile areas.

In FIG. 3, X, Y represent the numbers of pixels in the horizontal and vertical directions, respectively, of the first image 201, and p, q represent the numbers of pixels in the horizontal and vertical directions, respectively, of each tile area. Accordingly, the relations X=p×M, Y=q×N hold.

Figure 4:
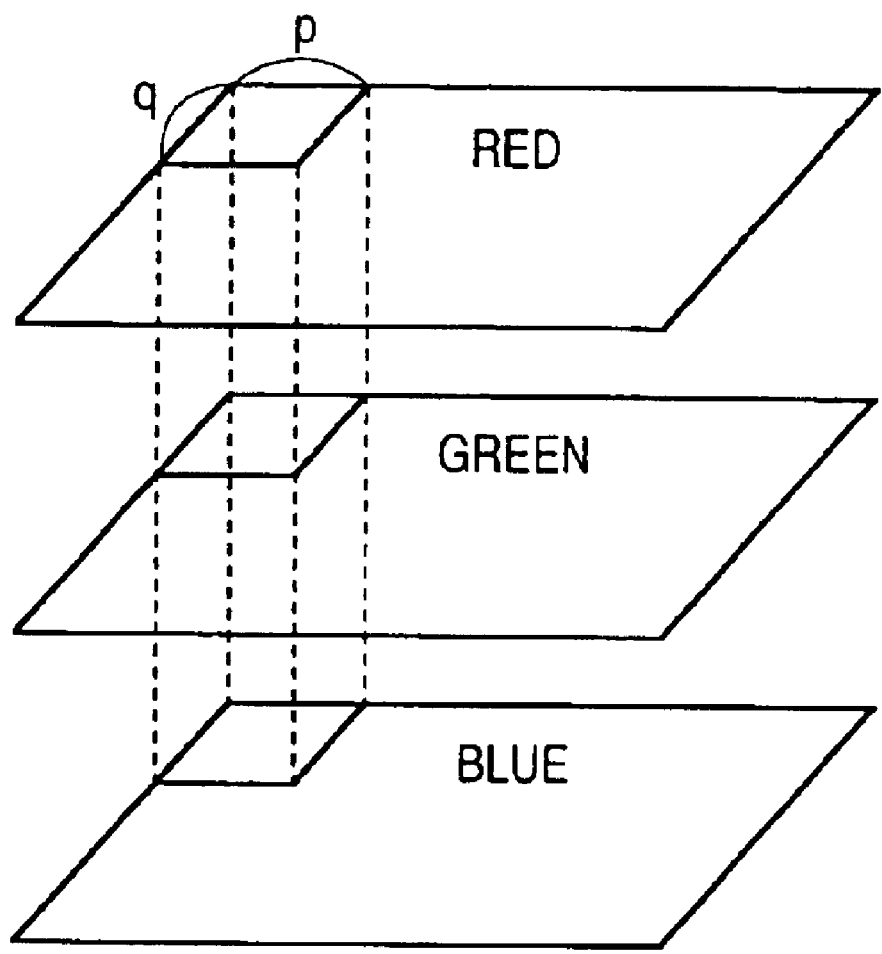
FIG. 4 is a diagram useful in describing color planes of the tile areas.

FIG. 4 is a diagram illustrating the composition of the pixel data of each tile area. Each tile area is composed of p×q pixels in each of the three primary color planes, namely the red (R), green (G) and blue (B) planes.

With reference again to FIG. 2, control proceeds to step S2, at which the average values of the color components R, G, B are calculated in accordance with the following equations in regard to each of the M×N tile areas:

$$Rd\_av = \Sigma Ri/(pxq) \quad (i = 1 \sim pq)$$
$$Gd\_av = \Sigma Gi/(pxq) \quad (i = 1 \sim pq)$$
$$Bd\_av = \Sigma Bi/(pxq) \quad (i = 1 \sim pq)$$

where "Rd_av" signifies the average value of the red (R) component of the destination (original image 201). The same holds true in regard to the other color components G and B. Further, $\Sigma$ indicates the summation from i=1 to i=pq.

This is followed by step S3, at which the average values of R, G, B are calculated in accordance with the equations shown below in regard to each of the P-number of material images 203. It should be noted that the material images 203 are assumed to be of the same size as the tile areas. Furthermore, it goes without saying that if the material images 203 and the average values of R, G, B of each material image have been stored in memory beforehand, this calculation processing will be unnecessary.

$$Rs\_av = \Sigma Ri/(pxq) \quad (i = 1 \sim pq)$$
$$Gs\_av = \Sigma Gi/(pxq) \quad (i = 1 \sim pq)$$
$$Bs\_av = \Sigma Bi/(pxq) \quad (i = 1 \sim pq)$$

where "Rs_av" signifies the average value of the red component of the source (material image). The same holds true in regard to the other color components G and B.

Control then proceeds to step S4, at which counters Xpos (0≦Xpos≦M−1), Ypos (0≦Ypos≦N−1), which indicate the position of a certain tile area to undergo processing, are both initialized to zero. Here the initial values (Xpos,Ypos)=(0,0) indicate the position of a tile area at the upper left-hand corner of image 201.

This is followed by step S5, at which a material image 203 best suited for the tile area TL (Xpos,Ypos) indicated by the counters Xpos and Ypos is selected. The method of selecting this material image involves calculating an RGB tristimulus-value distance ΔE between the average luminance value of the tile area and the average luminance value of each material image 203 and selecting the material image 203 for which the distance ΔE is smallest. The distance ΔE is obtained from the following equation:

$$\Delta E = (Rs\_av - Rd\_av)^2 + (Gs\_av - Gd\_av)^2 + (Bs\_av - Bd\_av)^2$$

If, when the material image 203 thus selected is pasted to the tile area undergoing processing, the sizes do not match, scaling processing is executed so that the material image 203 will become the proper size.

Control then proceeds to step S6, at which the position counter Xpos is incremented by 1 so that the position of the tile area to undergo processing is moved to the right. When the value in counter Xpos becomes M, the value is reset to "0" and the value in the counter Ypos is incremented by 1. Until it is determined at step S7 that the processing of step S5 has been applied to all tile areas of the first image 201, the processing of steps S5 to S7 is repeated.

The foregoing is a description of general processing for generating a mosaic image.

Figure 5:
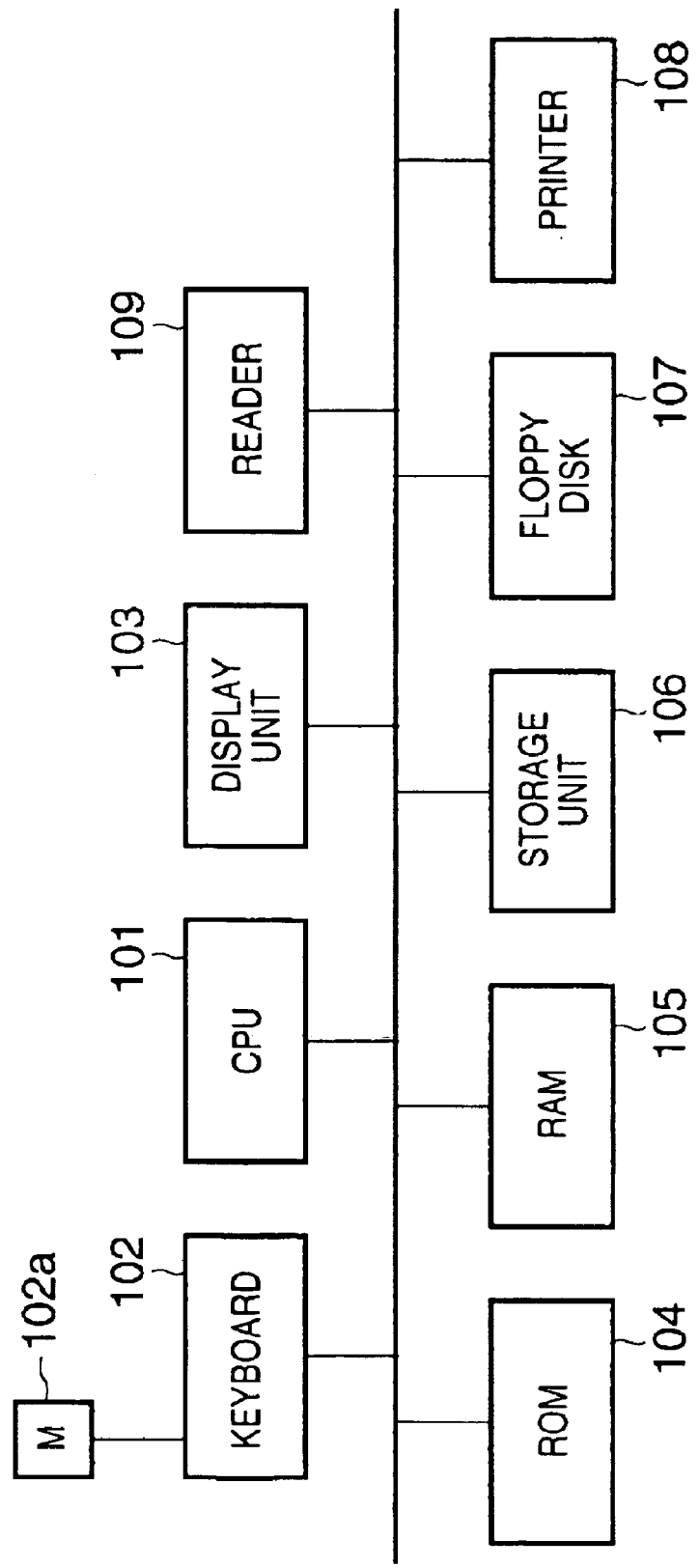
FIG. 5 is a block diagram illustrating the construction of an image processing apparatus according to an embodiment of the present invention.

FIG. 5 is a block diagram illustrating the construction of an image processing apparatus for generating a mosaic image according to this embodiment of the present invention.

As shown in FIG. 5, the apparatus includes a CPU 101 for controlling the entire system in accordance with a program installed and stored in a storage-unit 106 such as a hard disk from a CD-ROM or the like, and then loaded into a RAM 105 at the time processing is executed. A keyboard 102 is used together with a mouse 102a in order to input various commands and data to the image processing apparatus of this embodiment. A display unit 103, which has a CRT or liquid crystal panel, displays image data that has been stored in the storage unit 106 or an image input from an reader 109. A ROM 104 and the RAM 105 constitute the memory of the apparatus and store the executed program and data, etc. Further, the storage unit 106, which is a hard disk or an optical disk, etc., constitutes an image database. A floppy disk device 107 constitutes an external storage device used by the image processing apparatus of this embodiment. A printer 108 is connected to the apparatus.

Further, a plurality (P-number) of tile images which are the components of a mosaic image have been stored in the storage unit 106. In accordance with a program, described later, a mosaic image is created by combining M×N number of images, which have been selected from these tile images, to obtain M images in the horizontal direction and N images in the vertical direction, as shown in FIG. 3. It should be noted that the average values of R, G and B of each material image may also be stored in the storage unit 106 together with the material images. In such case the calculation processing of step S3 in FIG. 2 need not be executed. The mosaic image thus created is stored in the storage unit 106 as an image file and is displayed on the display unit 103 or printed out by a printer 108. The reader 109 is a scanner, for example, for reading in the basic image 201.

It should be noted that the image processing apparatus of this embodiment is provided with various components other than those mentioned above. However, as these components do not constitute a principal portion of the present invention, they need not be described here.

[First Embodiment]

Processing for generating a mosaic image in an image processing apparatus according to a first embodiment of the present invention will now be described in accordance with the flowchart shown in FIG. 6. The program for executing this processing has been stored in RAM 105 and is run under the control of the CPU 101.

The first image 201 is divided into the M×N number of tile areas at step S300. As a result, as shown in FIG. 3, 4×5 rectangular tile areas TL (0,0), TL (1,0), TL (2,0), . . . , TL (2,4), . . . , TL (3,3), TL (3,4) are generated. Next, at step S301, each of the M×N number of tile areas is subdivided into a plurality of subareas (i.e., r×s pixels, where r<p, s<q holds), and average values of R. G, B are calculated in regard to each subarea in accordance with the following equations through processing similar to that of step S2 in FIG. 2:

$$Rd\_av = \Sigma Ri/(rxs) \quad (i = 1 \sim rs)$$
$$Gd\_av = \Sigma Gi/(rxs) \quad (i = 1 \sim rs)$$
$$Bd\_av = \Sigma Bi/(rxs) \quad (i = 1 \sim rs)$$

where Σ indicates the summation from i=1 to i=r·s.

This is followed by step S302, at which each of the P-number of material images 203 is similarly subdivided into r×s subareas and the average values of R, G, B are calculated in accordance with the equations shown below. It should be noted that image characteristics such as the average values of R, G, B of each subarea of individual material images 203 can also be obtained and stored beforehand in the storage unit 106 or the like. In such case the image characteristic of each subarea obtained by dividing each material image may be stored as header information of the material image 203 or may be recorded in a table corresponding to each material image 203 that has been stored in the storage unit 106.

$$Rs\_av = \Sigma Ri/(rxs) \quad (i = 1 \sim rs)$$
$$Gs\_av = \Sigma Gi/(rxs) \quad (i = 1 \sim rs)$$
$$Bs\_av = \Sigma Bi/(rxs) \quad (i = 1 \sim rs)$$

Control proceeds to step S303, where the counters Xpos (0≦Xpos≦M−1), Ypos (0≦Ypos≦N−1), which indicate the position of a tile area to undergo processing, are both initialized to zero. Here (Xpos, Ypos)=(0,0) indicates the position of the tile area [TL (0,0)] at the upper left-hand corner of first image 201. It should be noted that the counters Xpos, Ypos are provided in RAM 105.

Control then proceeds to step S304, at which the material image 203 best suited for the tile area at address (Xpos, Ypos), which is indicated by the counters Xpos and Ypos, is retrieved and decided on. The processing for determining this material image will be described later with reference to the flowchart of FIG. 7.

Control then proceeds to step S305, at which the material image retrieved and decided on at step S304 is pasted to the tile area undergoing processing. If the size of the tile area undergoing processing and the size of the material image do not match in this processing for pasting the material image, scaling processing is executed in such a manner that the size of the material image will take on the size of the tile area.

This is followed by step S306, at which the value in counter Xpos is incremented by 1 and, if the value in counter Xpos becomes M, the value is made value "0" and the value in counter Ypos is incremented by 1. Until it is determined at step S307 that the processing has been applied to all tile areas of the first image 201, the processing of steps S304 to S306 is repeated.

Figure 7:
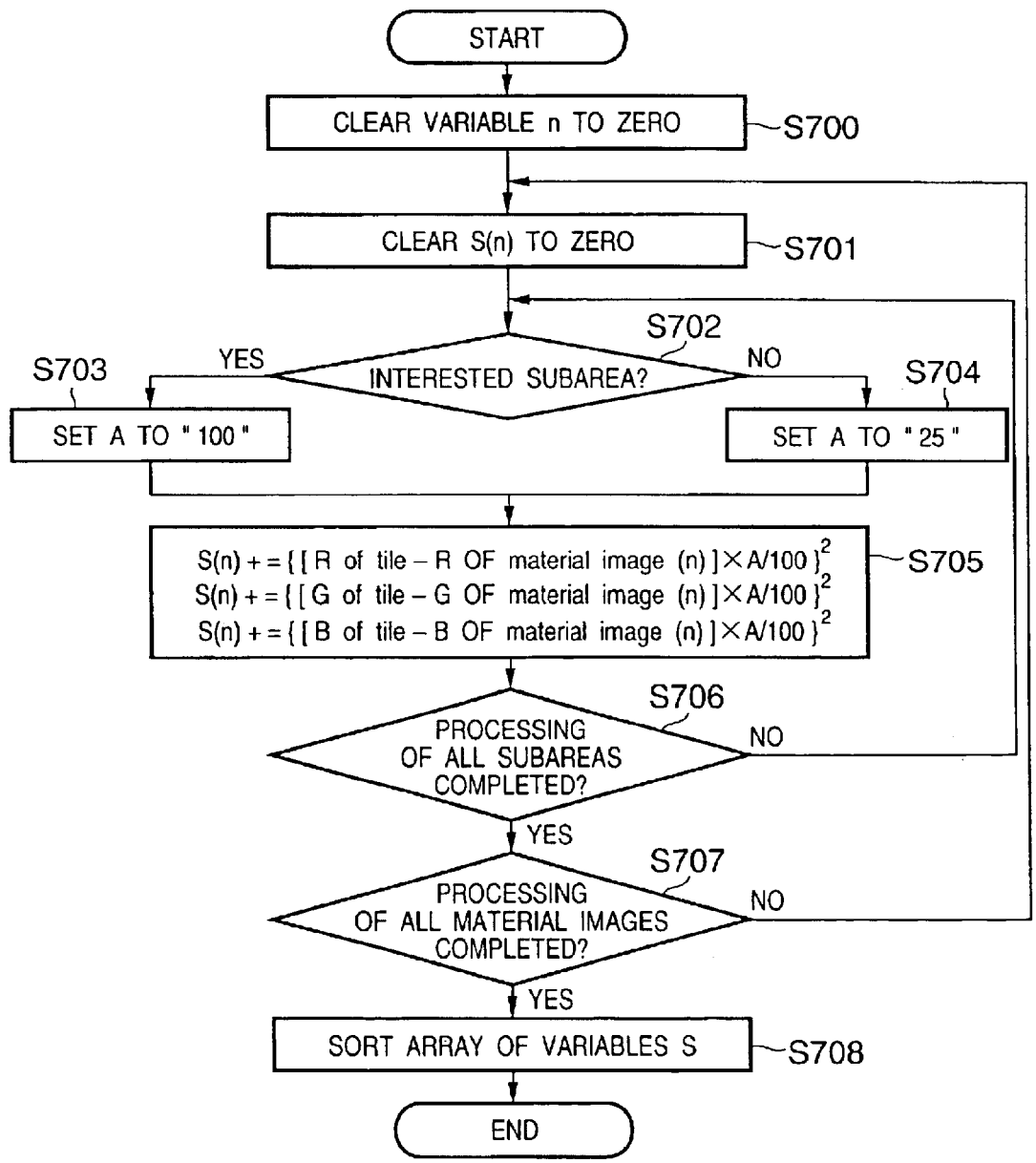
FIG. 7 is a flowchart illustrating processing executed at step S304 in FIG. 6 for searching and selecting material images.

Processing for searching and retrieving material images at step S304 mentioned above will now be described with reference to the flowchart of FIG. 7.

Figure 6:
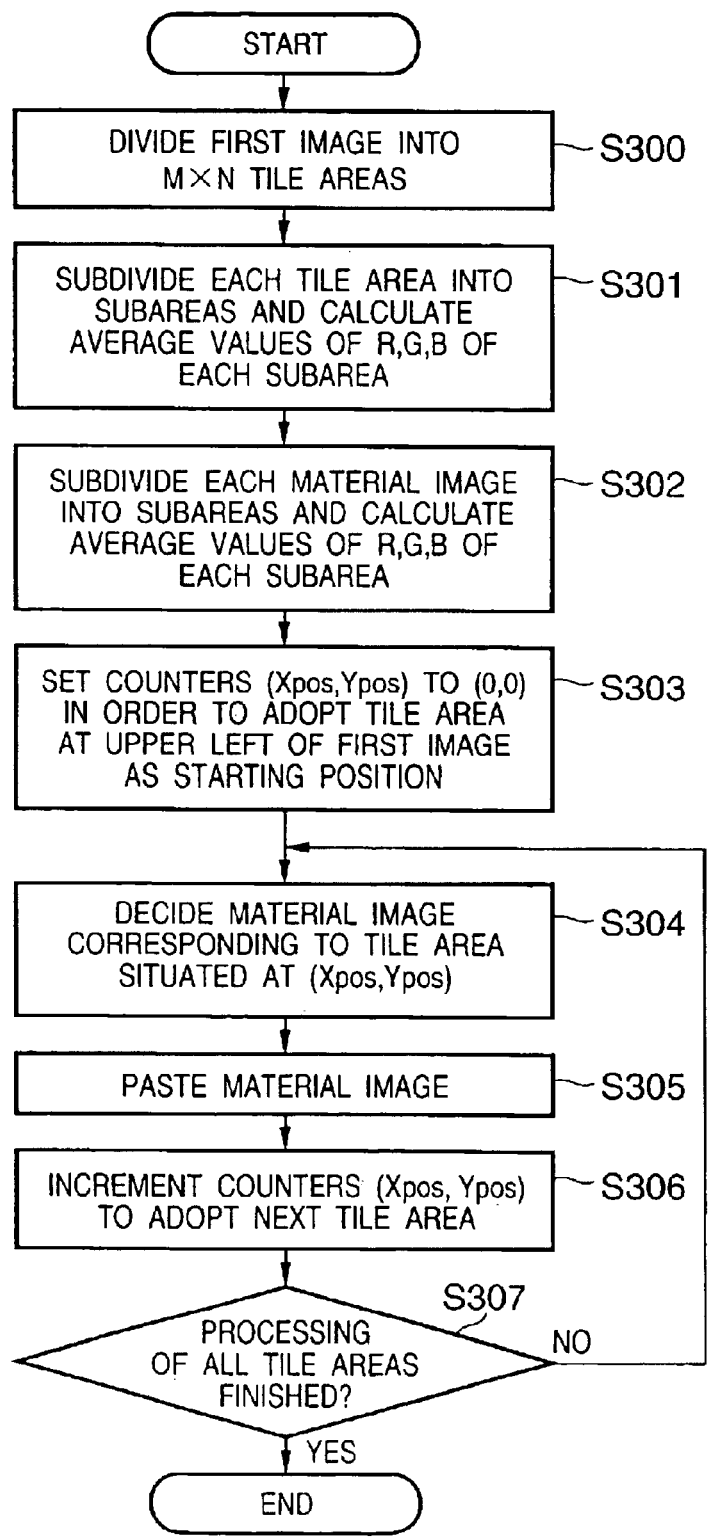
FIG. 6 is a flowchart illustrating processing for generating a mosaic image in an image processing apparatus according to a first embodiment of the present invention.

Here it is assumed that before the processing for generating a mosaic image shown in FIG. 6 starts being executed, the user specifies whether the mosaic image is to be subjected to a search for material images under the condition that the mosaic image does not have a portion whose importance is particularly stressed ("NO PORTION PARTICULARLY STRESSED") or that the importance of the central portion of the mosaic image is stressed ("STRESS CENTRAL PORTION"). For example, it will be assumed that the user has selected "STRESS CENTRAL PORTION".

A variable n for specifying the material image 203 is cleared to "0" at step S700. The variable n is for specifying a material image (n) among a plurality of material images that have been stored in the storage unit 106. Control then proceeds to step S701, at which an array variable S(n) is cleared to "0". The array variable S(n) contains the distance between the feature quantity of each material image 203 and that of the image of each tile area of the first image 201.

Figure 8:
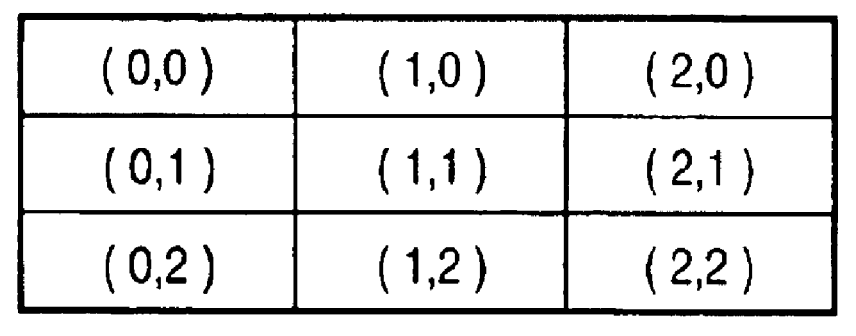

Control then proceeds to step S702, at which it is determined whether a portion upon which importance is to be placed has been specified by the user. By way of example, assume that "STRESS CENTRAL PORTION" has been specified ("YES" at step S702). As mentioned earlier, each tile area and each material image have been divided into respective numbers of subareas, with the subareas close to the central portion being the five subareas (1,0), (0,1), (1,1), (2,1), (1,2), as shown in FIG. 8. When the distances between the feature quantities of corresponding ones of these five subareas and the distances between the feature quantities of corresponding ones of the other subareas are calculated, the calculation is performed while weighting is changed.

More specifically, a tile area undergoing processing and a material image (n) specified by the variable n are each divided into a plurality of subareas in the manner shown in FIG. 8, by way of example. The distance between each subarea of the tile area and each subarea of the material image designated by the variable n is obtained for each of the color components R, G, B. If "STRESS CENTRAL PORTION" has been specified, then, from among the nine subareas (FIG. 8) of the tile area and of the material image, a coefficient A of equations for finding the distances between the five centrally location subareas (1,0), (0,1), (1,1), (2,1), (1,2) of the tile area and their counterparts of the material image for each of the color components R, G, B is made larger than coefficients B, C of equations for finding the distances between the other subareas of the tile area and their counterparts of the material image. By way of example, in case of a subarea situated substantially at the central portion in the tile area and in the material image, processing branches from step S702 to step S703, where "100" is set for a variable A for changing weighting. In case of another subarea, processing branches from step S702 to step 5704, at which "25" is set for the variable A.

Step S703 and step S704 are followed by step S705, at which the distance between these subareas is calculated based upon the following equations:

$$S(n)+=\{[R \text{ of tile-}R \text{ of material image } (n)] \times A/100\}^2$$

$$S(n)+=\{[G \text{ of tile-}G \text{ of material image } (n)] \times A/100\}^2$$

$$S(n)+=\{[B \text{ of tile-}B \text{ of material image } (n)] \times A/100\}^2$$

Thus are obtained array variables which indicate the difference between each subarea of a certain tile area and its counterpart subarea of a certain material image for each of R, G, B. The result of summing the three array variables for R, G, B per each subarea is determined as an array variable S(n) which indicates the difference between this tile area and the material image (n) in regard to this subarea.

Next, control proceeds to step S706, at which the next subarea is designated and it is determined whether computation of the distances between all subareas of this material image and all subareas of the tile area undergoing processing has been completed. If the answer is "NO", then control returns to step S702 and the above-described processing is applied to the next subarea.

If the processing of all subareas is thus completed, then the sum total of the computations of distance between this material image and the tile area undergoing processing, namely the sum total of the computation of distance between each of the subareas, is obtained and computation processing ends. Control then proceeds to step S707, at which it is determined whether the processing of steps S701 to S706 has been executed for all of the material images 203 stored in the storage unit 106. If the answer is "NO", control returns to step S701 and the above-described processing is repeated.

If the processing of all material images is thus completed, control proceeds to step S708, at which the array variables S(n) are sorted in order of increasing size. If an array variable S(x) which is smallest is obtained as a result, the central portion of the xth material image is decided on as the material image nearest to the central portion of the tile area undergoing processing. The material image thus selected is pasted to the tile area undergoing processing. This is performed at step S305 in FIG. 6.

Thus, it is possible to generate a mosaic image by designating a location of interest, which is a central portion (or peripheral portion) of each tile area of the first image 201 and of each material image, performing a search which places emphasis upon this location of interest, and selecting the most suitable material image. Alternatively, it is possible to generate a mosaic image by performing a search under the condition "NO PORTION PARTICULARLY STRESSED".

By way of example, an arrangement may be adopted in which a material image that has already been pasted to a tile area of the first image 201 cannot be used again for other tile areas. Further, it may be so arranged that the number of times a material image is used is limited.

According to the first embodiment described above, weighting of the value regarding the coefficient A is performed by adopting "100", as the value of coefficient A of a component whose importance is emphasized and adopting "25" as the coefficient B of other components. However, the values of these coefficients are not limited to those mentioned. Further, the distances obtained may be distances regarding luminance (Y) and color differences (Cb, Cr) rather than R, G, B.

Further, separate count values may be set in dependence upon the degree of the importance of the area designated by the user.

Further, in a case where the condition is "NO PORTION PARTICULARLY STRESSED", the same value may be used for all of the subareas, making it unnecessary to decide values. Furthermore, in a case where the condition is "STRESS CENTRAL PORTION", it is described that weighting is applied to the subareas mentioned above. However, it can readily be inferred that this does not impose a limitation upon the present invention.

In addition to selection of "STRESS CENTRAL PORTION" or "NO PORTION PARTICULARLY STRESSED", another method is to allow the user to designate the portion to be emphasized. In such case, an arrangement may be adopted wherein which subarea of each material image is to be emphasized can be designated by using the mouse 102a or the like under conditions in which the material images are being displayed on the display unit 103.

Further, it is possible to emphasize separate subareas in each tile area of the first image. Furthermore, the method of dividing each tile area or material image into subareas is not limited to that shown in FIG. 8. Other methods of division, numbers of divisions and shapes of the divided areas can readily be inferred.

Furthermore, the method of dividing each tile area of the first image 201 into subareas and the method of dividing each material image 203 into subareas need not be the same. In a case where the methods of dividing each tile area and material image into subareas are different methods (or the numbers of subareas obtained by division are different), it will suffice to provide means for obtaining the subareas corresponding to tile areas and material images and judging which portions are to be emphasized and which are not.

[Second Embodiment]

Processing for generating a mosaic image in an image processing apparatus according to a second embodiment of the present invention will now be described in accordance with the flowchart shown in FIG. 9. The program for executing this processing has been stored in RAM 105 and is run under the control of the CPU 101. It should be noted that the components of the image processing apparatus in the second embodiment are the same as those shown in FIG. 5 and are not described again for this reason.

The second embodiment is so adapted that when material images best suited for tile areas are selected, it is possible to designate selection of a material image that is nearest in terms of luminance or selection of a material image that is nearest in terms of color difference.

First, the first image 201 is divided into the M×N number of tile areas at step 400. As a result, as shown in FIG. 3, 4×5 rectangular tile areas TL (0,0), TL (1,0), TL (2,0), . . . , TL (2,4), . . . , TL (3,3), TL (3,4) are generated. Next, control proceeds to step S401, at which the average values of R, G, B are calculated in accordance with the following equations in regard to each of the M×N tile areas through processing similar to that of FIG. 2:

| | |
|---|---|
| $Rd\_av = \Sigma Ri/(pxq)$ | $(i = 1 \sim pq)$ |
| $Gd\_av = \Sigma Gi/(pxq)$ | $(i = 1 \sim pq)$ |
| $Bd\_av = \Sigma Bi/(pxq)$ | $(i = 1 \sim pq)$ |

A conversion is then made to Y, Cb, R in accordance with the following equations based upon the average values of R, G, B:

$Y=0.2990R+0.5870G+0.1140B$ $Cb=0.1687R-0.3323G+0.5000B+128$ $Cr=0.5000R-0.4187G+0.0813B+128$

This is followed by step S402, at which the average values of R, G, B are calculated in accordance with the following equations in regard to each of the P-number of material images 203:

| | |
|---|---|
| $Rs\_av = \Sigma Ri/(pxq)$ | $(i = 1 \sim pq)$ |
| $Gs\_av = \Sigma Ci/(pxq)$ | $(i = 1 \sim pq)$ |
| $Bs\_av = \Sigma Bi/(pxq)$ | $(i = 1 \sim pq)$ |

These average values of R, G, B are also converted to Y, Cb, Cr in similar fashion.

Control proceeds to step S403, where the counters Xpos ($0 \leq Xpos \leq M-1$), Ypos ($0 \leq Ypos \leq N-1$), which indicate the position of a tile area to undergo processing, are both initialized to zero. Here (Xpos, Ypos)=(0,0) indicates the position of the tile area at the upper left-hand corner of first image 201. It should be noted that the counters Xpos, Ypos are provided in RAM 105.

Control then proceeds to step S404, at which the material image 203 best suited for the tile area at address (Xpos, Ypos), which is indicated by the counters Xpos and Ypos, is retrieved and decided on. The processing for determining this material image will be described later with reference to the flowchart of FIG. 10.

Control then proceeds to step S405, at which the material image retrieved and decided on at step S404 is pasted to the tile area undergoing processing. If the size of the tile area undergoing processing and the size of the material image do not match in this processing for pasting the material image, scaling processing is executed in such a manner that the size of the material image will take on the size of the tile area.

This is followed by step S406, at which the value in counter Xpos is incremented by 1 and, if the value in counter Xpos becomes M, the value is made value "0" and the value in counter Ypos is incremented by 1. Until it is determined at step S407 that the processing has been applied to all tile areas of the first image 201, the processing of steps S404 to S406 is repeated.

Processing for searching and retrieving material images at step S404 mentioned above will now be described with reference to the flowchart of FIG. 10.

Figure 9:
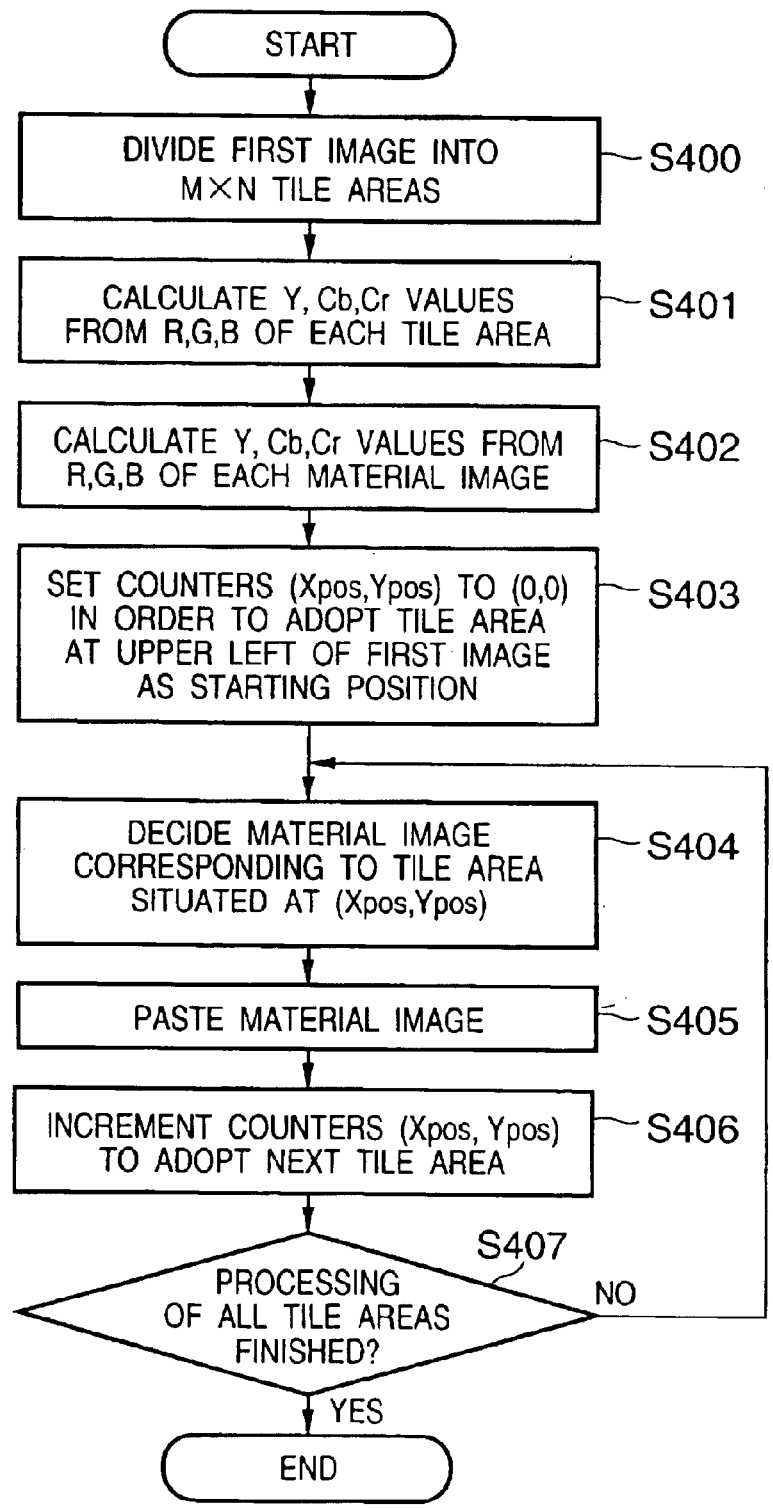
FIG. 9 is a flowchart illustrating an example of processing for generating a mosaic image in an image processing apparatus according to a second embodiment of the present invention.

Here it is assumed that before the processing for generating a mosaic image shown in FIG. 9 starts being executed, the user specifies whether the mosaic image is to be created under the condition "STRESS LUMINANCE" or under the condition "STRESS COLOR DIFFERENCE", and that processing for searching and retrieving material images is executed in association with the specification made.

First, at step S410, variables A and B used in subsequent processing are set in the work area of RAM 105 in accordance with the content indicating what is to be stressed. By way of example, "A=75", "B=25" are set in case of "STRESS LUMINANCE", and "A=25", "B=75" are set in case of "STRESS color difference". If "STRESS LUMINANCE" has been selected, for example, then we have A=75, B=25. As a result, the distance between luminance components is stressed, as will be described later in connection with step S413.

Control then proceeds to step S411, at which a variable n (a pointer which designates the material image) that has been set in RAM 105 is made "0". The variable S(n) in RAM 105 is made "0" at step S412.

Next, at step S413, the calculation of distance between the images is performed, while applying the weighting that was set at step S410, with regard to each of the components Y, Cb, Cr. The distance calculation is performed in accordance with the following equations:

$$S(n) += \{[Y \text{ of tile} - Y \text{ of material image } (n)] \times A/100\}^2$$

$$S(n) += \{[Cb \text{ of tile} - Cb \text{ of material image } (n)] \times B/100\}^2$$

$$S(n) += \{[Cr \text{ of tile} - Cr \text{ of material image } (n)] \times B/100\}^2$$

Thus are obtained array variables which indicate the difference between the luminance of a certain tile area and that of a certain material image as well as the differences between the color-difference components of a certain tile and those of a certain material image. The result of summing these three array variables is determined as an array variable S(n) which indicates the difference between this tile area and the material image (n).

Next, at step S414, the value of the variable n which designates the referential material image 203 is incremented by 1 and it is determined whether array variables S(n) have been obtained by performing the distance calculation of step S413 for material images 203 that have been stored in the storage unit 106. More specifically, the variable n is incremented by 1 and it is determined whether the resulting value is equal to or greater than P (the total number of material images 203). If this value is less than P, then control returns to step S412 and the above-described processing is repeated. Thus, if the value of n becomes equal to or greater than P and the distances between the tile area undergoing processing and all material images that have been stored in the storage unit 106 are calculated to decide P-number of array variables, control proceeds to step S415. Here the P-number of array variables S are sorted in order of increasing size. As a result, an xth material image having the smallest distance in relation to Y, Cb and Cr is decided on as the material image whose luminance is closest to the tile area undergoing processing and whose color is somewhat close to this tile area, this material image being adopted as that suited to this tile area. The material image thus selected is pasted to the tile area undergoing processing. This is performed at step 405 in FIG. 9.

Thus, in accordance with the second embodiment, as described above, it is possible to emphasize luminance and generate a mosaic image from the first image 201 using material images the luminance whereof is near that of the first image 201. Alternatively, it is possible to emphasize color difference and generate a mosaic image from the first image 201 using material images the color difference whereof is close to the color of the first image 201.

According to the second embodiment described above, the values of variables A and B which set the criteria for selecting material images are set in such a manner that the variable value for stressing importance is made "75" while the other variable value which does not stress importance is made "25". However, this does not impose a limitation upon the present invention.

The selection of "STRESS LUMINANCE" or "STRESS COLOR DIFFERENCE" can be set by other methods as well. For example, a scroll bar may be displayed on the display unit 109 and a position on the bar may be scrolled to change the values of the variables A and B.

According to the second embodiment described above, the value of a coefficient A of a component whose importance is emphasized is made "75" and the coefficient B of other components is made "25", and weighting of the value A regarding the coefficient A is performed. However, the values of these coefficients are not limited to those mentioned. Further, separate values may be set for respective ones of luminance (Y) and color differences (Cb, Cr) in dependence upon the degree of stressing designated by the user.

Further, according to the second embodiment, the scheme described is one in which the selection of "STRESS LUMINANCE" or "STRESS COLOR DIFFERENCE" is performed with respect to the entirety of the first image 201 to thereby generate the mosaic image. Described next will be the generation of a mosaic image by stressing "STRESS LUMINANCE" or "STRESS COLOR DIFFERENCE" for each tile area of the first image 201, which has been divided into the M×N tile areas, or for each of certain tile areas.

First, a case in which an image feature quantity to be stressed is changed for each of the M×N tile areas obtained by division of the first image will be described. In this case, the method is one in which "STRESS LUMINANCE" and "STRESS COLOR DIFFERENCE" are switched between tile area by tile area. In order to achieve this, it has been described in the second embodiment that A=75, B=25 are set in case of "STRESS LUMINANCE" and A=25, B=75 in case of "STRESS COLOR DIFFERENCE". However, the above can be achieved by interchanging the values of A and B tile area by tile area.

Another method of switching between "STRESS LUMINANCE" and "STRESS COLOR DIFFERENCE" is to change the values of A and B gradually tile area by tile area.

Figure 10:
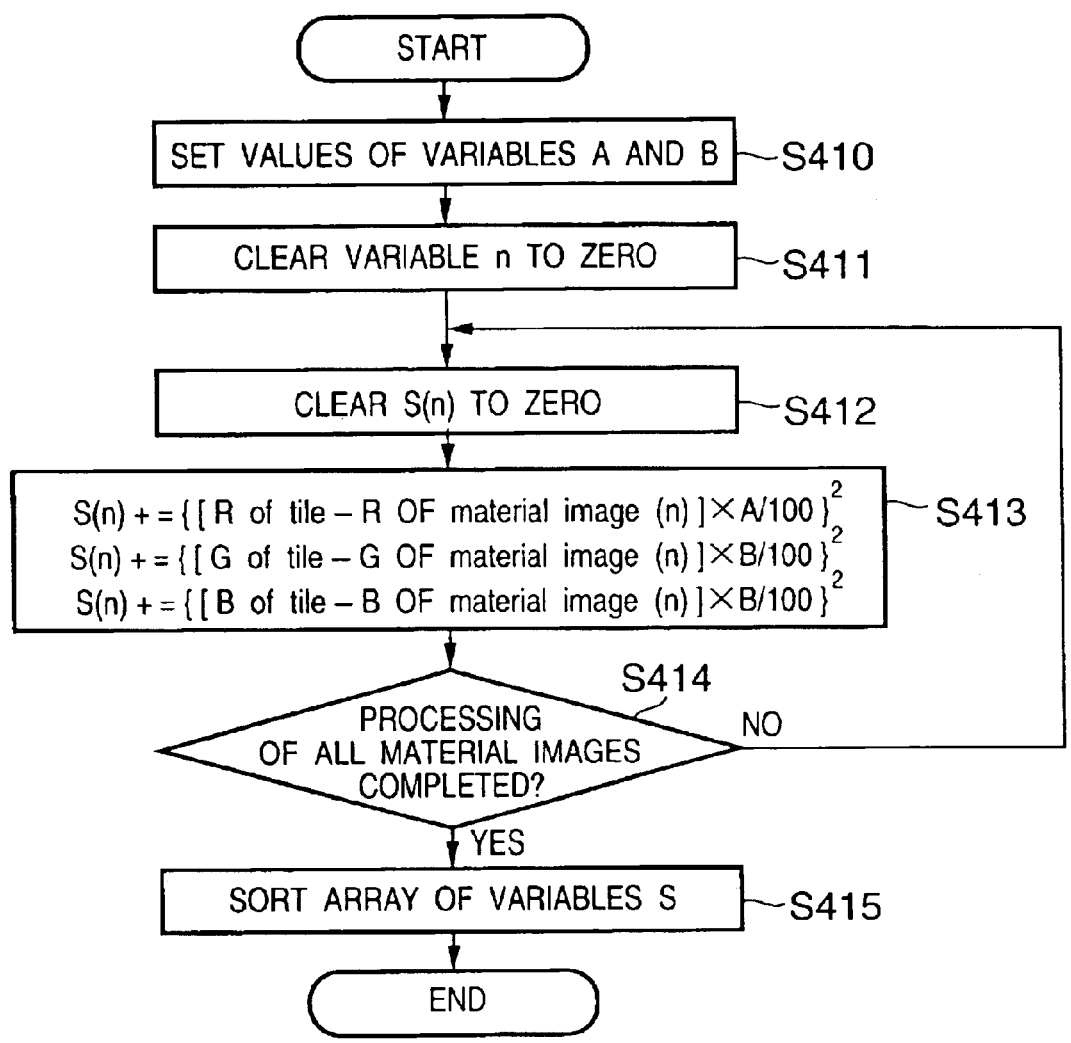
FIG. 10 is a flowchart illustrating processing executed at step S404 in FIG. 9 for searching and selecting material images.

By way of example, the processing "SET VARIABLES A, B TO 100, 0" is added to step S403 in FIG. 9 and the processing of step S410 in FIG. 10 is replaced by "A=A−5; IF (A<0) A=100; B=B+5; IF (B>100) B=0;". In this case, a gradual change is made from "STRESS LUMINANCE" to "STRESS COLOR DIFFERENCE" as the processing of each tile area proceeds. Of course, the initial values of A and B or the amounts of conversion thereof are not limited to the values cited above.

Furthermore, it is possible to divide the first image 201 into a plurality of areas, search and retrieve a corresponding material image under the condition "STRESS LUMINANCE" for a certain area and search and retrieve a corresponding material image under the condition "STRESS COLOR DIFFERENCE" for a certain area. The method of dividing the first image into areas in this case may involve using predetermined areas or allowing the user to designate a stressed area and stressed image feature quantity using the keyboard 102 or mouse 102a. By virtue of such processing, use of identical material images for a plurality of contiguous tile areas is reduced, thereby making it possible to eliminate texture and unexpected patterns from the generated mosaic image.

[Third Embodiment]

A third embodiment of the present invention will now be described. The third embodiment is characterized in that when a tile area on which a material image is to be disposed preferentially is selected from among a plurality of tile areas obtained by dividing the first image 201, a material image resembling this tile area is selected preferentially and pasted to this tile area, while the remaining material images are pasted to the other tile areas.

Figure 11:
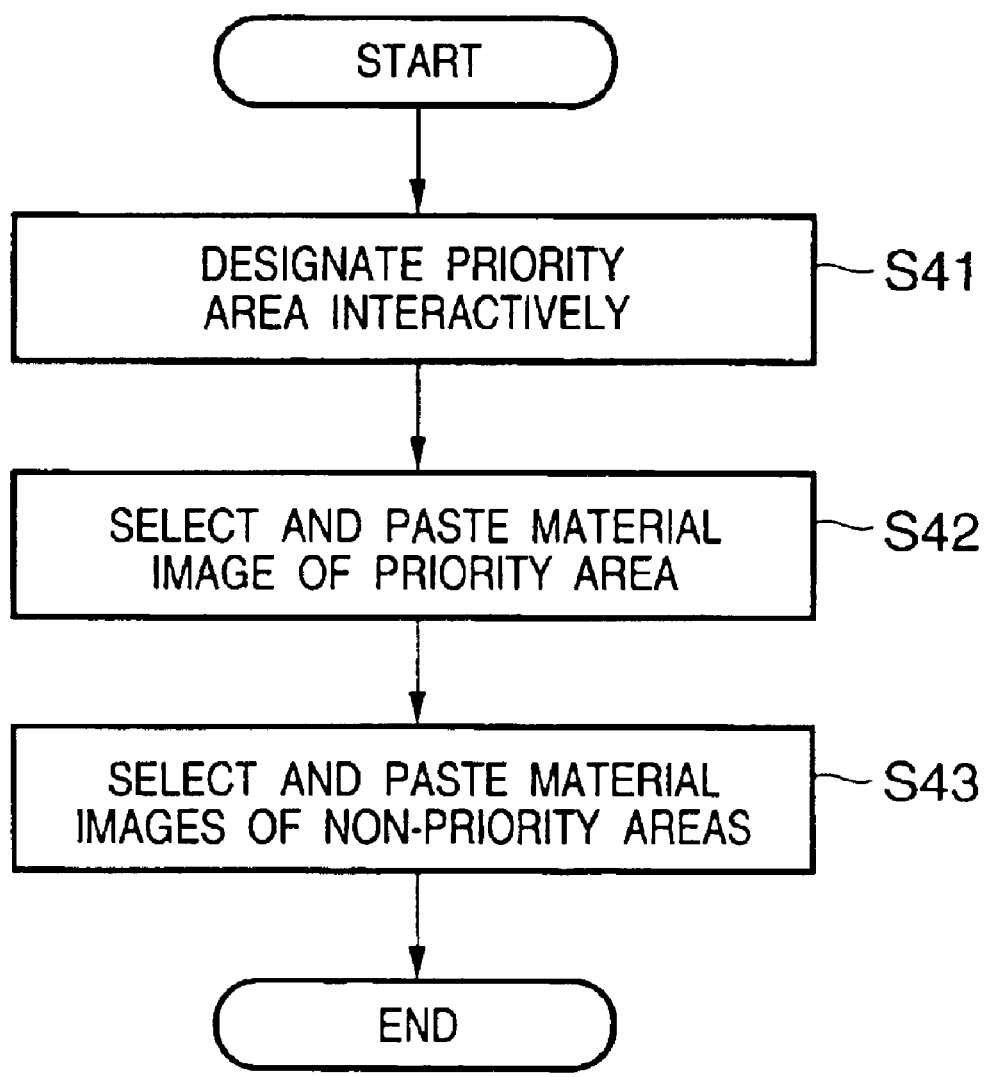
FIG. 11 is a flowchart illustrating the flow of processing for generating a mosaic image according to a third embodiment of the present invention.

FIG. 11 is a flowchart illustrating the flow of general processing of a method of generating a mosaic image in an image processing apparatus according to the third embodiment. The program for executing this processing has been stored in the hard disk 106 and is loaded into the RAM 105 and run by the CPU 101 at the time of execution.

When the original image 201 is divided into a plurality of areas (tile areas), a tile area to which a material image is to be assigned preferentially is selected at step S41 by the operator interactively from among the plurality of tile areas using the keyboard 102 or pointing device 102a. Control then proceeds to step S42, at which a certain material image is assigned and pasted to the designated tile area having the high priority. This is followed by step S43, at which resembling material images among the remaining material images are assigned and pasted to low-priority tile areas not selected at step S41.

The operation of each of the steps shown in FIG. 11 will be described with reference to FIG. 11.

[Detailed Description of Step S41]

At step S41, the original image 201 is displayed on a display screen 1002 of the display unit 103 and priority areas are selected interactively by using the keyboard 102, etc. Here an image corresponding to the image 201 is being displayed on the display screen 103 in the manner shown in FIG. 12, by way of example. An exit button is indicated 1001. By designating the button 1001 with a cursor 1005, which is moved by the pointing device 102a, and then clicking this button by using the pointing device, step S41 is terminated and control moves to step S42.

Figure 12:
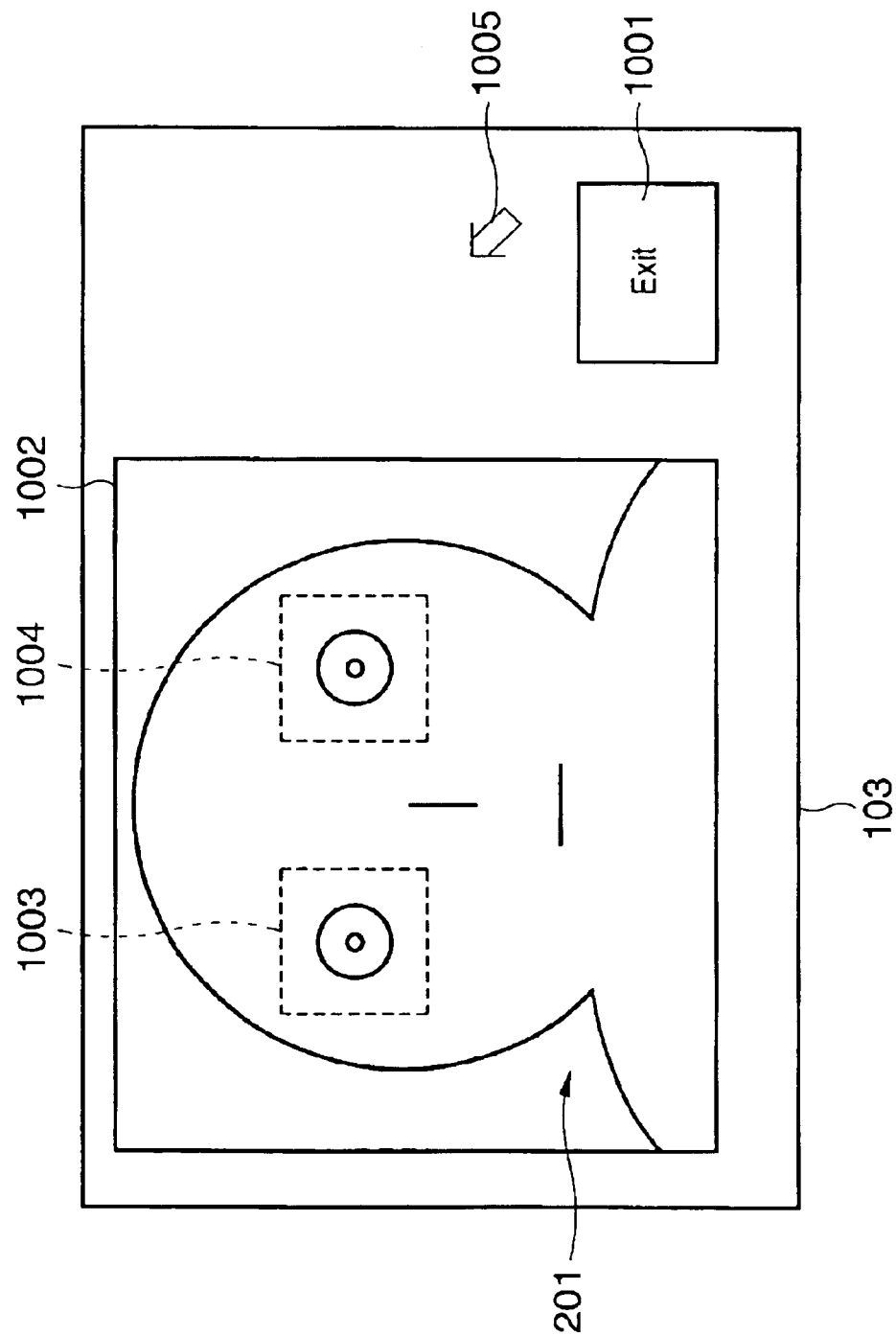
FIG. 12 is a diagram useful in describing the designation of a material image using a display screen.

In FIG. 12, numerals 1003 and 1004 denote priority areas selected in accordance with the operation performed by the operator.

Specifically, while observing the original image 201 displayed on the screen 1002, the operator employs the pointing device 102a to designate the image areas to which material images are to be assigned preferentially. Generally speaking, the entirety of the original image 201 is uniformly important. For example, if the original image is the image of a face of the kind depicted in FIG. 12, reconstruction of the eyes would be considered to be particularly important in terms of image quality. Accordingly, this illustrates a case where the image areas 1003, 1004, which correspond to the positions of the eyes, have been designated.

Because the aforementioned plurality of material images 203 are a limited resource in the generation of a mosaic image, important image areas in the original image 201 are designated and material images are assigned preferentially to these important image areas. For image areas that are not important, however, the selection and assignment of material images is made from those that remain. This makes it possible to improve the image quality of the overall mosaic image.

It should be noted that flag information such as a priority flag is set in correspondence with each pixel, for example, for an image area that has thus been designated as a high-priority area.

[Detailed Description of Step S42]

Figure 13:
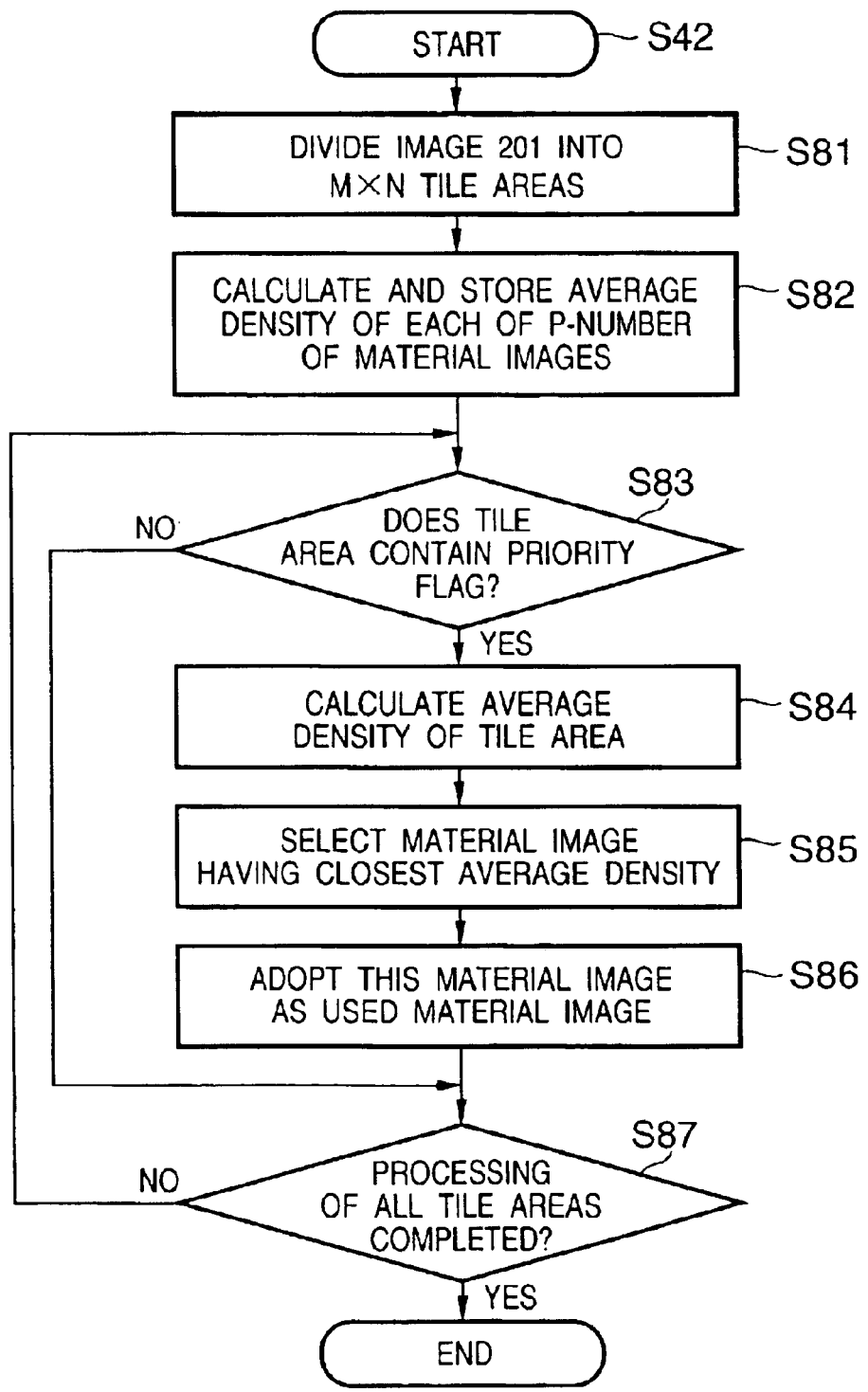
FIG. 13 is a flowchart useful in describing processing for selecting and pasting material images with respect to priority image areas executed in an image processing apparatus according to the third embodiment.

FIG. 13 is a flowchart showing the flow of processing of step S41 of FIG. 11 for selecting, from among a plurality of material images, a material image the average density of which is closest to the image area designated as a high-priority area, and pasting the selected material image to this image area.

The original image 201 is divided into the M×N number of tile areas at step S81. As a result, as shown in FIG. 3 described earlier, the original image 201 is divided into M×N rectangular tile areas TL (0,0), TL (1,0), TL (2,0), . . . , TL (2,4), . . . , TL (3,3), TL (3,4). In FIG. 3, X, Y represent the numbers of pixels in the horizontal and vertical directions, respectively, of the image 201, and p, q represent the numbers of pixels in the horizontal and vertical directions, respectively, of each tile area. Accordingly, the relations X=p×M, Y=q×N hold. It should be noted that the sizes of all of the tile areas are assumed to be the same in order to simplify the description but that this is not necessarily required in the third embodiment.

Next, control proceeds to step S82, at which the average densities of the color components R, G, B are calculated in accordance with the equations below in regard to each of the P-number of material images and are then stored in the RAM 105. It goes without saying that if the average densities of these material images have been obtained in advance and stored in correspondence with respective ones of the material images, then this calculation processing will be unnecessary.

$$Rs\_av = \Sigma Ri/(p \times q)$$
$$Gs\_av = \Sigma Gi/(p \times q)$$
$$Bs\_av = \Sigma Bi/(p \times q)$$

where s_av signifies the average value of the source (the material image), and Rs_av, Gs_av, Bs_av indicate the average densities of the red, green and blue components in each material image. Further, Σ indicates the summation from i=1 to i=pq.

This is followed by step S83, at which tile areas are investigated successively starting from the tile area TL (0,0) at the upper left of the image 201 based upon the counters Xpos (0≦Xpos≦M−1), Ypos (0≦Ypos≦N−1) that indicate the position of the tile area, to thereby determine whether the above-mentioned priority flag has been set for this tile area, i.e., whether the tile area includes a priority area designated at step S41. If the area is not a priority area, control proceeds to step S87. If the area is a priority area, control proceeds to step S84, at which the average density of this tile area is obtained. This is performed in accordance with the following equations:

$$Rd\_av = \Sigma Ri/(pxq)$$
$$Gd\_av = \Sigma Gi/(pxq)$$
$$Bd\_av = \Sigma Bi/(pxq)$$

where d_av signifies the average value of the destination (the original image 201), and Rd_av, Gd_av, Bd_av indicate the average densities of the red, green and blue components in each tile. Further, Σ indicates the summation from i=1 to i=pq.

This is followed by step S85, at which the material image for which the difference in average density with respect to this tile area is smallest is selected from among the P-number of material images. By way of example, the selection method involves calculating an RGB tristimulus-value distance ΔE and selecting the material image having the smallest distance value. The estimating expression for ΔE is as follows:

$$\Delta E = (Rs\_av - Rd\_av)^2 + (Gs\_av - Gd\_av)^2 + (Bs\_av - Bd\_av)^2$$

On the basis of this expression, the material image for which the distance ΔE is smallest is selected from among the P-number of material images.

Next, at step S86, the material image that has been selected is stored as a used material image (i.e., a material image used in a priority area).

Control then proceeds to step S87, at which the position of the tile area to be targeted in the image 201 undergoing processing is moved to the next position and it is determined whether the processing of all tile areas in the image 201 has been completed. If the answer is "NO", control returns to step S83 and the above-described processing is repeated.

[Detailed Description of Step S43]

Selection of material images is performed at step S43 with regard to tile areas for which selection and pasting of material images was not carried out at step S42, namely tile areas not selected as priority areas.

Figure 14:
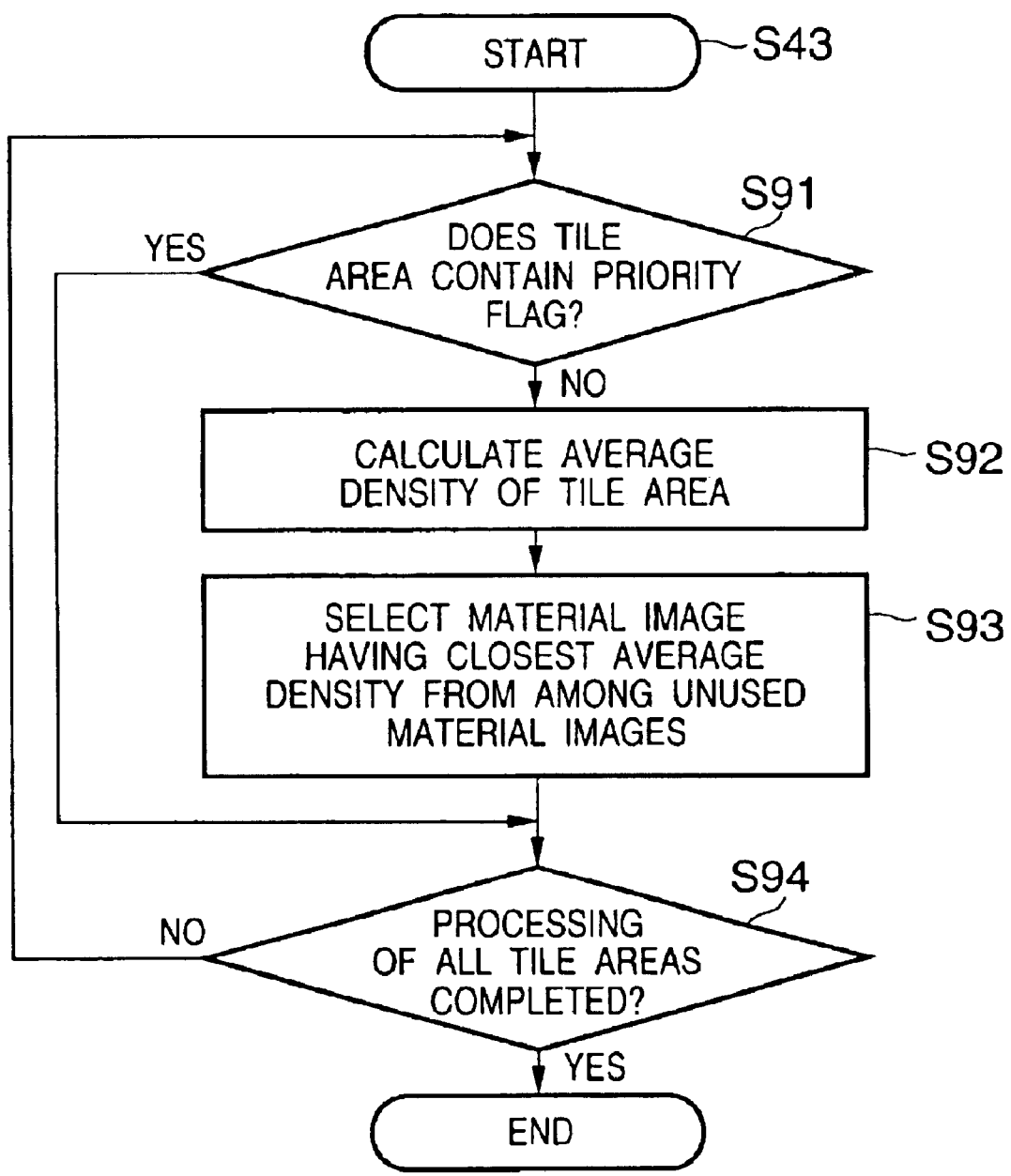
FIG. 14 is a flowchart useful in describing processing for selecting and pasting material images with respect to non-priority image areas executed in an image processing apparatus according to the third embodiment.

FIG. 14 is a flowchart useful in describing the processing of step S43 in FIG. 11 applied to tile areas other than priority areas.

At step S91, in a manner similar to that of step S83 described above, tile areas are investigated successively starting from the tile area TL (0,0) at the upper left of the image 201 based upon the counters Xpos (0≦Xpos≦M−1), Ypos (0≦Ypos≦N−1) that indicate the position of the tile area, to thereby determine whether the above-mentioned priority flag has been set for this tile area, i.e., whether the tile area includes a priority area designated at step S41. If the area is a priority area, this means that the processing for this tile area has been completed and, hence, control proceeds to step S94. If the area is not a priority area, control proceeds to step S92, at which the average density of this tile area is obtained. This is obtained through processing similar to that of step S84 described above.

Next, at step S93, the material image whose average density is closest to the average density of this tile area is selected from among the unused material images, namely the material images not yet used at the priority area, and this selected material image is pasted to this tile area.

The selection method involves calculating an RGB tristimulus-value distance ΔE and selecting the material image having the value. The estimating expression for ΔE is as follows:

$$\Delta E = (Rs\_av - Rd\_av)^2 + (Gs\_av - Gd\_av)^2 + (Bs\_av - Bd\_av)^2$$

On the basis of this expression, the material image for which the distance ΔE is smallest is selected from among the material images not used at the priority area.

This is followed by step S94, at which it is determined whether processing of all material images has been completed. If the answer is "NO", control returns to step S91 and processing similar to the foregoing is applied to the next tile area.

In the third embodiment as set forth above, an example is described in which the determination of an important area in an image is performed by the operator interactively. However, this does not impose a limitation upon the present invention.

By way of example, in a case where the image of a face is used as the original image, as mentioned above, areas generally considered to be important, such as the eyes, nose and mouth, can be discriminated mechanically using well-known recognition techniques. This will make it possible to automatic the processing described above. As long as important areas in an image can be discriminated automatically, as by using other techniques such as-background recognition or analyzing means, the discriminated image area may be adopted as a priority area.

Even if an image area should happen to be discriminated as being an important area erroneously, the only result will be a decline in the quality of the mosaic image and not a major failure.

Another option is to combine interactive selection and automatic selection of important areas. For example, several candidates for important areas may be presented to the operator by automatic selection, and the operator may choose any one of these candidates. Alternatively, important areas provided by automatic selection may be presented to the operator and the operator may judge whether they are appropriate. If they are appropriate, the process advances to the next step. If a problem is detected, the operator may re-select the area interactively.

Thus, in accordance with the third embodiment, as described above, the quality of a mosaic image can be improved by selecting an area deemed to be especially important in an image as a priority area, preferentially selecting the optimum material image and then pasting it to the tile area that contains this priority area.

[Fourth Embodiment]

[Processing for Generating Monochrome Mosaic Image]

A fourth embodiment of the present invention will now be described. The fourth embodiment relates to a case where a monochrome mosaic image is created.

Figure 15:
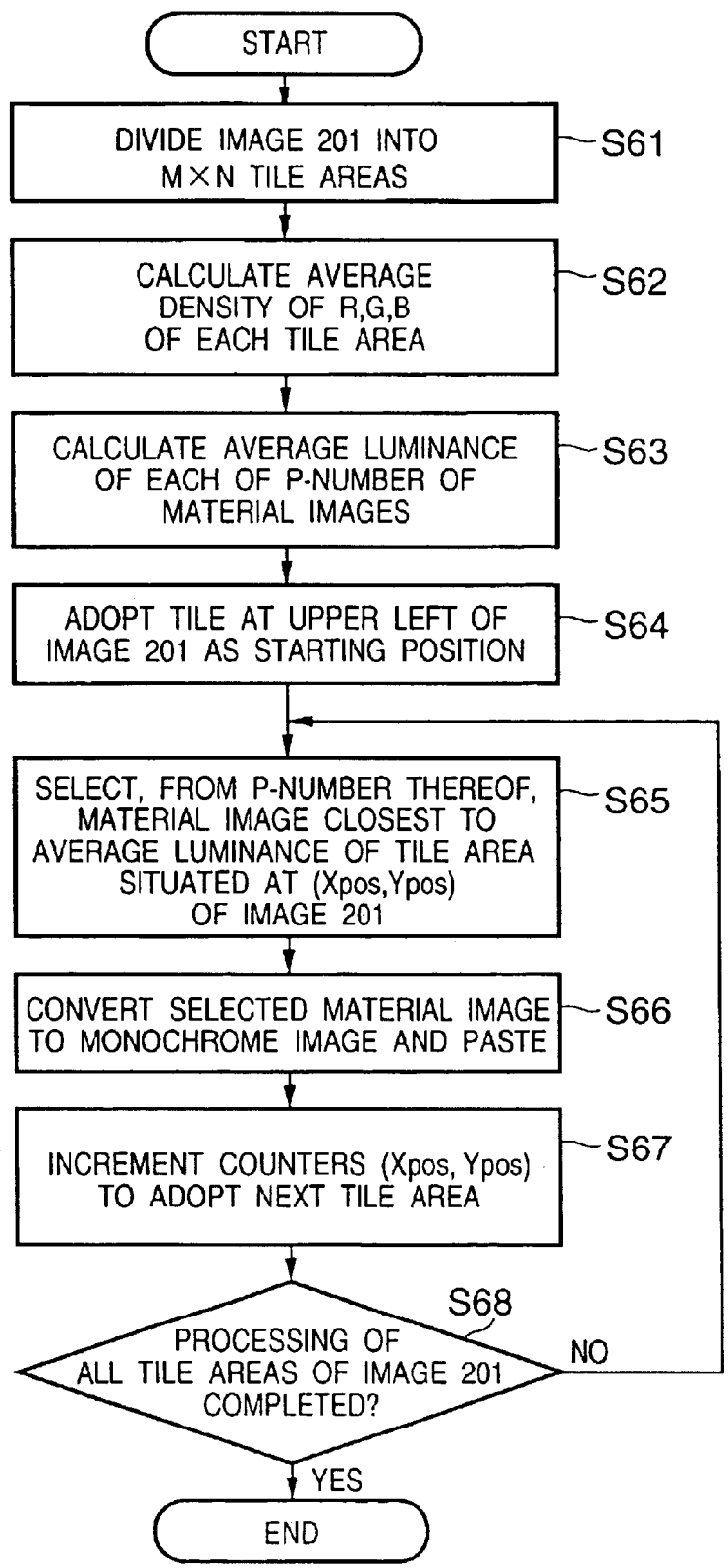
FIG. 15 is a flowchart useful in describing the flow of processing for generating a monochrome mosaic image according to a fourth embodiment of the present invention.

FIG. 15 is a flowchart illustrating the flow of processing for generating a monochrome mosaic image according to the fourth embodiment.

The image 201 is divided into M×N tile areas at step S61. As a result, as shown in FIG. 3 described earlier, the first image 201 is divided into M×N rectangular tile areas TL (0,0), TL (1,0), TL (2,0), . . . , TL (2,4), . . . , TL (3,3), TL (3,4).

It should be noted that the sizes of all of the tile areas are assumed to be the same in order to simplify the description but that this is not necessarily required in this embodiment.

Next, control proceeds to step S62, at which the average luminance of each of the M×N tile areas obtained by division at step S61 is calculated. First, through processing similar to that of step S2 in FIG. 2, the average densities of R, G, B are calculated.

$$Rd\_av = \Sigma Ri/(pxq) \quad (i = 1 \text{ to } pq)$$
$$Gd\_av = \Sigma Gi/(pxq) \quad (i = 1 \text{ to } pq)$$
$$Bd\_av = \Sigma Bi/(pxq) \quad (i = 1 \text{ to } pq)$$

Average luminance is then calculated from these values in accordance with the following equation:

$$Ys\_av = R(Rd\_av \times 77 + Gd\_av \times 150 + Bd\_av \times 29 + 128)/256$$

Control then proceeds to step S63, at which average luminance is calculated in regard to each of the P-number of material images 203. First, through processing similar to that of step S3 in FIG. 2, the average densities of R, G, B are calculated.

$$Rs\_av = \Sigma Ri/(pxq) \quad (i = 1 \text{ to } pq)$$
$$Gs\_av = \Sigma Gi/(pxq) \quad (i = 1 \text{ to } pq)$$
$$Bs\_av = \Sigma Bi/(pxq) \quad (i = 1 \text{ to } pq)$$

Average luminance is then calculated from these values in accordance with the following equation:

$$Ys\_av = R(Rd\_av \times 77 + Gd\_av \times 150 + Bd\_av \times 29 + 128)/256$$

Next, at step S64, through processing similar to that of step S4 described earlier, counters Xpos (0≦Xpos≦M−1), Ypos (0≦Ypos≦N−1), which indicate the position of the tile area undergoing processing, are both initialized to zero. Here (Xpos, Ypos)=(0,0) indicates the position of a tile area at the upper left-hand corner of image 201.

This is followed by step S65, at which a material image best suited for the tile area indicated by the counters Xpos and Ypos is selected from among the P-number of material images 203. By way of example, the selection method involves calculating a Y stimulus-value distance ΔE and selecting the material image having the smallest stimulus value ΔE. The estimating expression for ΔE is as follows:

$$\Delta E = |Ys\_av - Yd\_av|$$

On the basis of this expression, the material image for which the stimulus value ΔE is smallest is selected from among the P-number of material images.

Control then proceeds to step S66, at which the selected material image 203 is read out of the storage unit 106, such as the hard disk, decoded and then rendered in black and white before being pasted to the tile area.

Next, at step S67, the tile area of image 102 to be processed is moved to the position of the next tile, and then it is determined at step S68 whether the processing of all tile areas of the image 201 has been completed. The processing of steps S65 to S68 is executed repeatedly until a "YES" decision is rendered at step S68.

Figure 2:
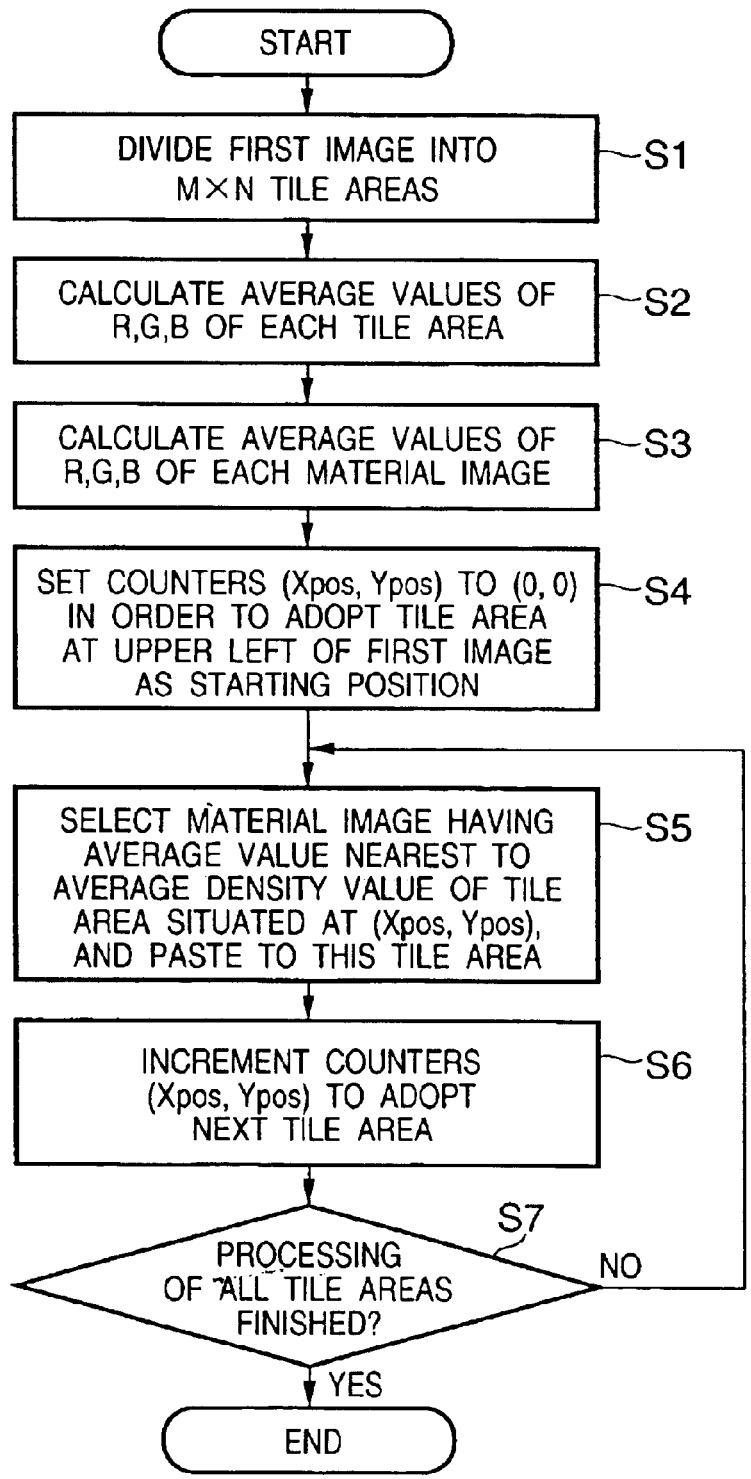
FIG. 2 is a flowchart useful in describing a general method of generating an image based upon a mosaic.

It should be noted that a color mosaic image created in accordance with the description of FIG. 2 set forth earlier can be converted to a monochrome image to obtain a monochrome mosaic image. However, since superfluous color information is taken into account in the process for selecting material images, there is the danger that the quality of the mosaic image obtained will decline.

In contrast, as in the fourth embodiment, by comparing the average luminance of each tile area with that of each material image and selecting the material image best suited to a tile area of interest, it is possible to create a monochrome mosaic image which exhibits a high quality.

[Modification of the Fourth Embodiment]

In the fourth embodiment, whether or not a mosaic image should be made a monochrome mosaic image is decided at the start. However, this decision may be automatically in conformity with the quality of a mosaic image that has been created. In such case, first a color mosaic image is created. Then, if the mosaic image obtained does not possess satisfactory quality, a decision may be made to obtain a monochrome mosaic image.

A well-known S/N ratio, for example, may be used as the criterion for judging the quality of a mosaic image in this case. If the S/N ratio of the original image 201 and that of the created mosaic image 202 do not attain a certain reference value, then the mosaic image may be rendered in black and white. Processing in this case is as illustrated in the flowchart of FIG. 16.

Figure 16:
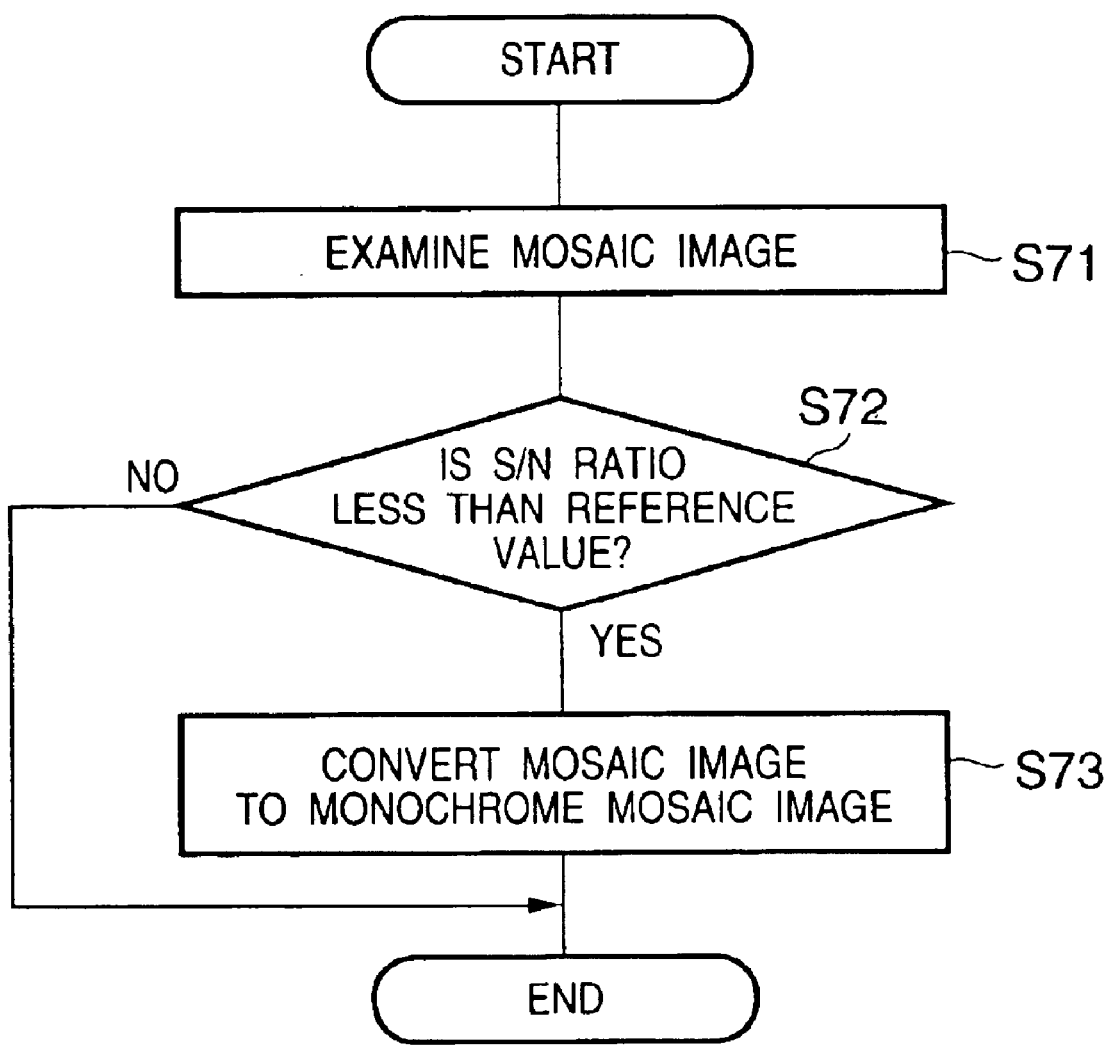
FIG. 16 is a flowchart useful in describing processing for converting a color mosaic image to a monochrome mosaic image according to the fourth embodiment.

At step S71 in FIG. 16, the S/N ratio of the mosaic image created in accordance with the flowchart of FIG. 15 is examined and it is then determined at step 572 whether the examined S/N ratio is less than a predetermined reference value. If the answer is "YES", then this mosaic image is converted to a monochrome mosaic image at step S73.

When material images are pasted in the fourth embodiment described above, each material image is rendered in black and white and then the material image is pasted to the corresponding tile area. However, equivalent results can be obtained by generating a color mosaic image by pasting material images while still in color and then rendering the entire mosaic image in black and white.

Further, in the fourth embodiment, the average luminance Y is calculated from the R, G, B values of the image data representing the tile areas and material images. However, the calculation of average luminance Y can be dispensed with if use is made of image data expressed in YUV color space, as in the manner of well-known JPEG images.

Further, a sepia-toned mosaic image can be obtained by applying well-known sepia toning processing to a monochrome mosaic image that has been created.

In accordance with the fourth embodiment, as described above, the quality of a mosaic image can be improved.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments, and the storage medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

In the description given above, the embodiments are described independently of one another. It should be obvious, however, that these embodiments may be suitably combined as well as be employed separately.

The present invention is not limited to the above embodiments and various changes and modifications can be made within the spirit and scope of the present invention. Therefore, to apprise the public of the scope of the present invention, the following claims are made.

What is claimed is:

1. An image processing apparatus for combining material images, which have been selected from a plurality of material images, to create an image patterned after an original image, comprising:

input means for inputting an original image;

storage means for storing the plurality of material images;

image characteristic acquisition means for dividing the original image into a plurality of areas, subdividing each of these areas into a plurality of subareas and obtaining a first image characteristic of each subarea;

designation means for designating an important area of each of the plurality of material images;

means for obtaining a second image characteristic of each of the plurality of material images in dependence upon the important area designated by said designation means;

distance calculation means for calculating a difference between the first image characteristic and the second image characteristic to calculate distances between each area of the original image and each of the material images;

selection means for selecting a material image corresponding to each area in dependence upon the distances calculated by said distance calculation means; and generating means for generating the image patterned after the original image by pasting the material image selected by said selection means, to the corresponding each area of the original image.

2. The apparatus according to claim 1, wherein said image characteristic acquisition means acquires the first image characteristic by obtaining average R, G, B values of a plurality of pixel values which constitute the plurality of subareas.

3. The apparatus according to claim 1, further comprising means for dividing each of the plurality of material images into a plurality of subareas and obtaining the second image characteristic of each of these subareas.

4. The apparatus according to claim 1, wherein said distance calculation means calculates the difference upon enlarging weighing of the difference between the image characteristics corresponding to a subarea that has been designated by said designation means.

5. An image processing apparatus for forming an image patterned after an original image by combining a plurality of material images, comprising:

input means for inputting an original image;

storage means for storing the plurality of material images;

image characteristic acquisition means for dividing the an original image into a plurality of areas and obtaining an image characteristic of each area of the plurality of areas;

weighting input means for inputting weighting information for selecting material images;

distance calculation means for calculating distances between the image characteristic of each area of the original image and image characteristics of each of the plurality of material images based upon the weighting information that has been input by said weighting input means;

selection means for selecting material images corresponding to respective ones of the areas in dependence upon the distances calculated by said distance calculation means; and generating means for generating the image patterned after the original image by pasting each of the material images selected by said selection means, to the corresponding each area of the original image.

6. The apparatus according to claim 5, wherein said image characteristic acquisition means acquires the original image characteristic by obtaining average R, G, B values of a plurality of pixel values which constitute each of the plurality of areas.

7. The apparatus according to claim 5, wherein said image characteristic acquisition means acquires the image characteristic by obtaining average values of luminance and color differences of each of a plurality of pixels forming each area.

8. The apparatus according to claim 5, wherein said distance calculation means calculates distance between average values of luminance and color differences of pixels in each area and corresponding average values of luminance and color differences of pixels of each material image.

9. The apparatus according to claim 5, wherein the weighting information is information indicating whether the distance between each area and each material image is to be obtained upon stressing luminance or upon stressing color difference.

10. The apparatus according to claim 5, further comprising means for obtaining image characteristics of respective ones of the plurality of material images.

11. An image processing apparatus for combining material images, which have been selected from a plurality of material images, to create an image patterned after an original image, comprising:

designation means for designating a partial area in the original image;

dividing means for dividing the original image into a plurality of areas;

determination means for determining whether each of the plurality of areas obtained by division by said dividing means includes the partial area designated by said designating means; and similar-image selection means for preferentially selecting, from among a plurality of material images not yet selected, a material image that most closely resembles the area in which the partial area is included, determined by said determination means; and image pasting means for generating the image patterned after the original image, by pasting the material image selected by said similar-image selection means, to the area of the original image.

12. The apparatus according to claim 11, further comprising calculation means for calculating average density of each of the plurality of material images.

13. The apparatus according to claim 11, wherein said similar-image selection means has arithmetic means for calculating average densities of the areas, and
wherein material images to be assigned to the areas being decided in accordance with differences between average densities of respective ones of the areas calculated by said calculation means and average densities of respective ones of the plurality of material images.

14. The apparatus according to claim 11, wherein said similar-image selection means has arithmetic means for calculating average densities of the areas, and
wherein material images to be assigned to the areas being decided in accordance with differences between average densities, calculated by said arithmetic means, of areas determined not to include the partial area and average densities of respective ones of the plurality of material images not selected by said similar-image selection means.

15. The apparatus according to claim 11, wherein said designation means includes:
display means for displaying the original image; and
means for designating a partial area of the image displayed by said display means.

16. The apparatus according to claim 11, wherein said designation means has means for automatically discriminating and designating the partial area of the original image.

17. The apparatus according to claim 11, further comprising image selection means for selecting, from among a plurality of material images not selected by said similar-image selection means, material images that most closely resemble areas determined by said determination means not to include the partial area.

18. The method according to claim 11, further comprising an image selecting step, of selecting, from among a plurality of material images not yet selected, material images that most closely resemble areas determined in said determination step to include the partial area.

19. An image processing apparatus for combining material images, which have been selected from a plurality of material images, to create an image patterned after an original image, comprising:
dividing means for dividing the original image into a plurality of areas;
luminance calculation means for calculating average luminance of each of the plurality of areas obtained by division by said dividing means;
image selection means for selecting material images corresponding to respective ones of the plurality of areas based upon the average luminance of each of the plurality of areas calculated by said luminance calculation means and the luminance of each material image; and
image pasting means for generating the image patterned after the original image, by pasting the material images selected by said image selection means, to respective ones of corresponding areas of the original image.

20. The apparatus according to claim 19, wherein said image pasting means generates a monochrome image.

21. The apparatus according to claim 19, further comprising material-image luminance calculation means for calculating average luminance of each of the plurality of material images.

22. The apparatus according to claim 19, wherein said image selection means calculates differences between average luminances of respective ones of the plurality of areas and average luminances of the material images, and selects, as material images corresponding to the areas, materials images for which the distances are smallest.

23. The apparatus according to claim 19, further comprising means for rendering a material image, which has been selected by said image selection means, into a monochrome image.

24. The apparatus according to claim 19, further comprising:
inspecting means for inspecting an image obtained by pasting by said image pasting means; and
means for determining, in dependence upon results of inspection by said inspection means, whether the image is to be rendered into a monochrome image.

25. The apparatus according to claim 19, wherein said image pasting means generates sepia-toned mosaic image.

26. An image processing method for forming an image patterned after the original image by combining a plurality of material images, comprising the steps of:
dividing an original image into a plurality of areas;
obtaining an image characteristic of each area of the original image divided in said dividing step;
weighting and calculating distances between the image characteristic of each area and image characteristics of each of a plurality of material images;
selecting material images corresponding to respective ones of the areas in dependence upon the distance calculated in said weighting and calculating step; and
generating the image patterned after the original image by pasting the material images selected in said selecting step, to respective ones of corresponding areas of the original image.

27. The method according to claim 26, wherein a material image corresponding to each area is a material image having an image characteristic that most closely resembles the image characteristic of this area.

28. The method according to claim 26, wherein the image characteristic is average R, G, B values of a plurality of pixel values which constitute each area or each material image.

29. The method according to claim 26, wherein the image characteristic is average values of luminance and color differences of each of a plurality of pixels forming each area or each material image.

30. The method according to claim 26, wherein the calculation of the distances includes calculation for obtaining differences between average values of luminance and average values of color differences of pixels of each area and corresponding average values of luminance and average values of color differences of pixels of each material image.

31. The method according to claim 26, wherein the weighting is decided in dependence upon whether the distance between each area and each material image is to be obtained upon stressing luminance or upon stressing color difference.

32. The method according to claim 26, wherein the weighting is changed uniformly for the entire image that is the basis of the mosaic image or area by area.

33. The method according to claim 31, wherein a material image corresponding to each area is a material image having an image characteristic that most closely resembles the image characteristic of this area.

34. An image processing method for forming an image by combining a plurality of material images, comprising the steps of:

dividing an original image into a plurality of areas;

obtaining an image characteristic of each area the original image divided in said dividing step;

calculating distances between the image characteristic of each area and image characteristics of each of the plurality of material images based upon luminance or color difference of pixels of each area and each of the plurality of material images;

selecting material images corresponding to respective ones of the areas in dependence upon results of calculation; and generating the image patterned after the original image, by pasting the material images selected in said selecting step, to respective ones of corresponding areas of the original image.

35. An image processing method for combining material images, which have been selected from a plurality of material images, to create an image patterned after an original image, comprising:

a designation step, of designating a partial area in the original image;

a dividing step, of dividing the original image into a plurality of areas;

a determination step, of determining whether each of the plurality of areas obtained by division in said dividing step includes a partial area designated in said designating step; and a similar-image selection step, of preferentially selecting, from among the plurality of material images not yet selected, a material image that most closely resembles the area in which the partial area is included, determined in said determination step; and a pasting step, of generating the image patterned after the original image by pasting the material images selected in said similar-image selection step to respective ones of corresponding areas of the original image.

36. The method according to claim 35, further comprising a calculation step, of calculating average density of each of the plurality of material images.

37. The method according to claim 35, wherein said similar-image selection step has an arithmetic step of calculating average densities of the areas, and wherein material images to be assigned to the areas being decided in accordance with differences between average densities of respective ones of the areas calculated in said calculation step and average densities of respective ones of the plurality of material images.

38. The method according to claim 35, wherein said similar-image selection step has an arithmetic step of calculating average densities of the areas, and wherein material images to be assigned to the areas being decided in accordance with differences between average densities, calculated in said arithmetic step, of areas determined not to include the partial area and average densities of respective ones of the plurality of material images not selected in said similar-image selection step.

39. The method according to claim 35, wherein said designation step includes:

a display step, of displaying the original image; and a step of designating a partial area of the image displayed in said display step.

40. The method according to claim 35, wherein said designation step includes a step of automatically discriminating and designating the partial area of the original image.

41. An image processing method for combining material images, which have been selected from a plurality of material images, to create an image patterned after an original image, comprising:

a dividing step, of dividing the original image into a plurality of areas;

a luminance calculation step, of calculating average luminance of each of the plurality of areas obtained by division in said dividing step;

an image selection step, of selecting material images corresponding to respective ones of the plurality of areas based upon the average luminance of each of the plurality of areas calculated in said luminance calculation step and the luminance of each material image; and an image pasting step, of generating the image patterned after the original image by pasting the material images selected in said image selection step, to respective ones of corresponding areas of the original image.

42. The method according to claim 41, wherein said image pasting step generates a monochrome image.

43. The method according to claim 41, further comprising a material-image luminance calculation step, of calculating average luminance of each of the plurality of material images.

44. The method according to claim 41, wherein said image selection step calculates differences between average luminances of respective ones of the plurality of areas and average luminances of the material images, and selects, as material images corresponding to the areas, materials images for which the distances are smallest.

45. The method according to claim 41, further comprising a step of rendering a material image, which has been selected in said image selection step, into a monochrome image.

46. The method according to claim 41, further comprising:

an inspecting step, of inspecting an image obtained by pasting in said image pasting step; and a step of determining, in dependence upon results of inspection in said inspection step, whether the image is to be rendered into a monochrome image.

47. The method according to claim 41, wherein in said image pasting step, a sepia-toned mosaic image is generated.

48. A computer-readable storage medium storing a program which implements an image processing method for combining a plurality of material images, which have been selected from a plurality of material images, to create an image patterned after an original image, comprising:

a program code module for dividing a first image that is the basis of the mosaic image into a plurality of areas;

a program code module for subdividing each of these areas obtained by division into a plurality of subareas;

a program code module for dividing a material image into a plurality of subareas;

a program code module for weighting and calculating a difference between an image characteristic of the first image and an image characteristic of each of the subareas of each of the material images; and a program code module for selecting a material image corresponding to each area in dependence upon results of calculation, and replacing each area by the selected material image.

49. A computer-readable storage medium storing a program which implements an image processing method for combining a plurality of material images, which have been selected from a plurality of material images, to create an image patterned after an original image, comprising:

a program code module for dividing an image that is the basis of the mosaic image into a plurality of areas;

a program code module for obtaining an image characteristic of each area obtained by division;

a program code module for weighting and calculating distances between the image characteristic of each area and image characteristics of each of the plurality of material images; and a program code module for selecting material images corresponding to respective ones of the areas in dependence upon results of calculation, and replacing each area by the selected material image.

50. A computer-readable storage medium storing a program which implements an image processing method for combining a plurality of material images, which have been selected from a plurality of material images, to create an image patterned after an original image, comprising:

a program code module for dividing an image that is the basis of the mosaic image into a plurality of areas;

a program code module for obtaining an image characteristic of each area obtained by division;

a program code module for calculating distances between the image characteristic of each area and image characteristics of each of the plurality of material images upon stressing luminance or color difference; and a program code module for selecting material images corresponding to respective ones of the areas in dependence upon results of calculation, and replacing each area by the selected material image.

51. A computer-readable storage medium storing a program which implements an image processing method for combining a plurality of material images, which have been selected from a plurality of material images, to create an image patterned after an original image, comprising:

a program code module for dividing an image that is the basis of the mosaic image into a plurality of areas;

a program code module for calculating average luminance of each of the plurality of areas obtained by division;

a program code module for selecting material images corresponding to respective ones of the plurality of areas based upon the average luminance of each of the plurality of areas calculated and the luminance of each material image; and a program code module for generating an image by pasting the material images selected to respective ones of corresponding areas, and replacing each area by the selected material image.

\* \* \* \* \*

UNITED STATES PATENT AND TRADEMARK OFFICE
CERTIFICATE OF CORRECTION

PATENT NO. : 6,927,874 B1
DATED : August 9, 2005
INVENTOR(S) : Enokida et al.

It is certified that error appears in the above-identified patent and that said Letters Patent is hereby corrected as shown below:

Column 6,
Line 35, "an" (2nd occurrence) should read -- a --.

Column 16,
Line 33, "automatic" should read -- make automatic --.

Column 20,
Line 8, "the" should be deleted.

Column 23,
Line 5, "each area the" should read -- each area of the --.

Column 24,
Line 33, "materials" should read -- material --.

Signed and Sealed this

Sixth Day of December, 2005

JON W. DUDAS
*Director of the United States Patent and Trademark Office*